US012684645B2

(12) United States Patent
Wang et al.

(10) Patent No.: US 12,684,645 B2
(45) Date of Patent: Jul. 14, 2026

(54) METHODS, DEVICES, AND MEDIUM FOR COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 352 days.

(21) Appl. No.: 18/271,151

(22) PCT Filed: Jan. 13, 2021

(86) PCT No.: PCT/CN2021/071453
§ 371 (c)(1),
(2) Date: Jul. 6, 2023

(87) PCT Pub. No.: WO2022/151036
PCT Pub. Date: Jul. 21, 2022

(65) Prior Publication Data
US 2024/0129987 A1 Apr. 18, 2024

(51) Int. Cl.
*H04W 76/20* (2018.01)
*H04W 76/30* (2018.01)
*H04W 92/20* (2009.01)

(52) U.S. Cl.
CPC ........... *H04W 76/20* (2018.02); *H04W 76/30* (2018.02); *H04W 92/20* (2013.01)

(58) Field of Classification Search
CPC ..... H04W 76/20; H04W 76/30; H04W 92/20; H04W 76/27; H04W 76/32;
(Continued)

(56) References Cited

U.S. PATENT DOCUMENTS

2016/0278160 A1* 9/2016 Schliwa-Bertling ........................ H04W 76/27
2020/0196349 A1 6/2020 He et al.
(Continued)

FOREIGN PATENT DOCUMENTS

CN 111800888 A 10/2020
WO 2018/142207 A1 8/2018
(Continued)

OTHER PUBLICATIONS

JP Office Action for JP Application No. 2023-542583, mailed on Jul. 2, 2024 with English Translation.
(Continued)

*Primary Examiner* — Nimesh Patel
(74) *Attorney, Agent, or Firm* — Sughrue Mion, PLLC

(57) ABSTRACT

Example embodiments of the present disclosure relate to UP transmission for a device in an inactive mode. A first network device transmits data received from a terminal device in an inactive mode via a connection established for the terminal device between the first network device and the second network device to a second network device, and transmits, to the second network device, a first indication indicating a termination of a data transmission related with the terminal device if a first condition is met. Through this solution, the connection established for the terminal device in the inactive mode between the first network device and the second network device to a second network device may be terminated suitable.

12 Claims, 19 Drawing Sheets

400 ⟍

(58) Field of Classification Search
CPC ........... H04W 72/232; H04W 72/1268; H04W 72/23; H04W 72/0446; H04W 72/21; H04W 72/25; H04W 74/0808; H04W 92/18; H04W 64/00; H04W 72/40; H04W 74/004; H04W 48/12; H04W 72/1273; H04W 36/0088; H04W 4/029; H04W 72/51; H04W 72/541; H04W 74/002; H04W 72/54; H04W 74/0816; H04W 76/12; H04W 16/28; H04W 28/02; H04W 28/0268; H04W 36/0058; H04W 36/0061; H04W 36/00698; H04W 36/322; H04W 36/362; H04W 40/12; H04W 36/32; H04W 72/56; H04W 72/563; H04W 72/542; H04W 74/085; H04W 8/24; H04W 84/042; H04W 88/02; H04W 88/12; H04W 88/16; H04W 92/12; H04W 80/10; H04L 5/0053; H04L 5/0094; H04L 5/0023; H04L 5/14; H04L 1/0026; H04L 5/1469; H04L 1/1819; H04L 5/0016; H04L 1/0003; H04L 1/1893; H04B 7/0626; H04B 7/0456; H04B 7/0404; H04B 7/0639; H04B 7/0695; H04B 7/06952; H04B 17/336; H04B 17/328; H04B 7/0617; H04B 7/06966; H04B 7/0452; H04B 7/0632; H04B 7/0623; H04B 7/088; H04B 7/0413; H04M 15/66; H04M 15/41; H04M 15/8016; H04M 15/8228; H04M 15/8214; Y02D 30/70; G06N 20/00; G06N 3/00; G06N 3/063; G06N 3/098; G06N 3/084
See application file for complete search history.

(56) References Cited

U.S. PATENT DOCUMENTS

| | | | | |
|---|---|---|---|---|
| 2022/0039192 A1* | 2/2022 | Palat | ................. | H04W 12/0431 |
| 2022/0046749 A1* | 2/2022 | Lin | ...................... | H04W 76/30 |
| 2022/0248493 A1* | 8/2022 | Kim | ...................... | H04W 76/25 |
| 2022/0287137 A1* | 9/2022 | Futaki | ................... | H04W 48/20 |
| 2023/0284315 A1* | 9/2023 | Wang | ................... | H04W 76/19 |
| | | | | 370/329 |

FOREIGN PATENT DOCUMENTS

| | | |
|---|---|---|
| WO | 2021/163394 A1 | 8/2021 |
| WO | 2022/066892 A1 | 3/2022 |
| WO | 2022/128617 A1 | 6/2022 |

OTHER PUBLICATIONS

Qualcomm Incorporated, "Control plane aspects on NR small data transmission". 3GPP TSG-RAN WG2 Meeting #112e. R2-2010008 Nov. 2-13, 2020.

Extended European Search Report for EP Application No. 21918252. 4, dated on Jan. 30, 2024.

Huawei et al., "Small data transmission with RA-based schemes", 3GPP Draft, R2-2010280, Nov. 2-13, 2020, pp. 1-pp. 14.

Qualcomm Incorporated, "RACH based uplink small data transmission with or without anchor relocation", 3GPP Draft, R2-2007541, Aug. 17-28, 2020, pp. 1-pp. 4.

Ericsson, "Summary of email discussion [Post111-e][926][SmallData] Context Fetch", 3GPP TSG-RAN WG2 Meeting #112-e, R2-2009976, Nov. 2-13, 2020, pp. 1-22.

Huawei, Hisilicon, "SDT aspects common for RACH-based and CG-based SDT scheme", 3GPP TSG-RAN WG2#112-e, R2-2009930, Nov. 2-13, 2020, pp. 1-17.

CATT, "Analysis on SDT Procedures using CG", 3GPP TSG-RAN WG2 Meeting #112 electronic, R2-2009369, Nov. 2-13, 2020, pp. 1-5.

Written Opinion of the International Searching Authority for PCT/CN2021/071453 dated, Oct. 21, 2021(PCT/ISA/237).

International Search Report for PCT/CN2021/071453 dated, Oct. 21, 2021(PCT/ISA/210).

* cited by examiner

100

900

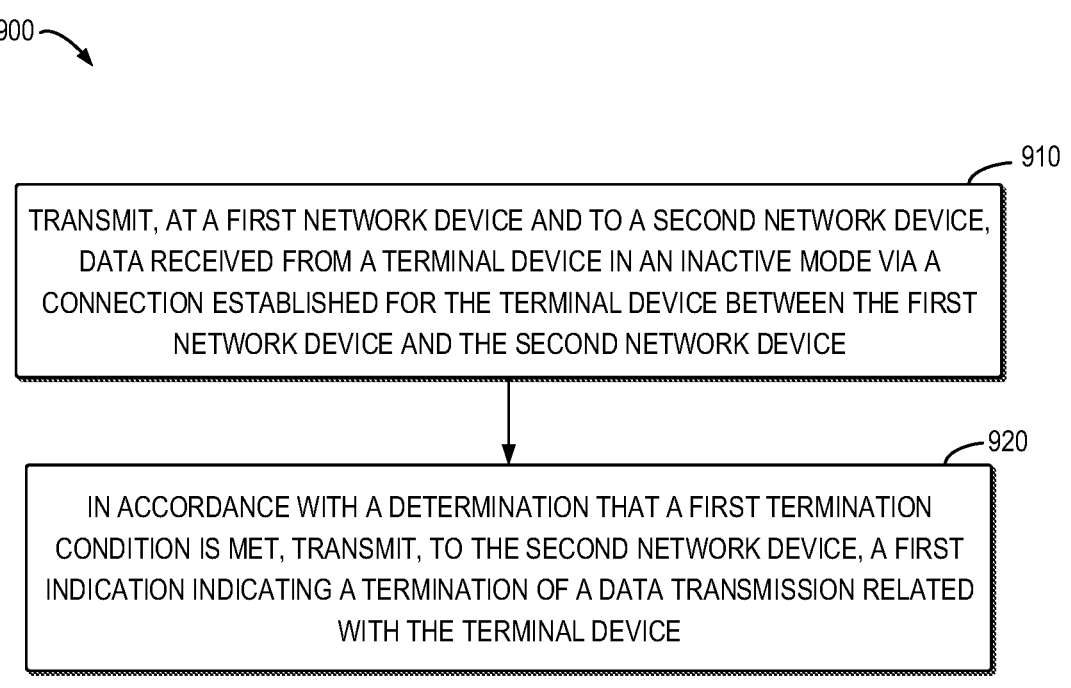

910

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

920

IN ACCORDANCE WITH A DETERMINATION THAT A FIRST TERMINATION CONDITION IS MET, TRANSMIT, TO THE SECOND NETWORK DEVICE, A FIRST INDICATION INDICATING A TERMINATION OF A DATA TRANSMISSION RELATED WITH THE TERMINAL DEVICE

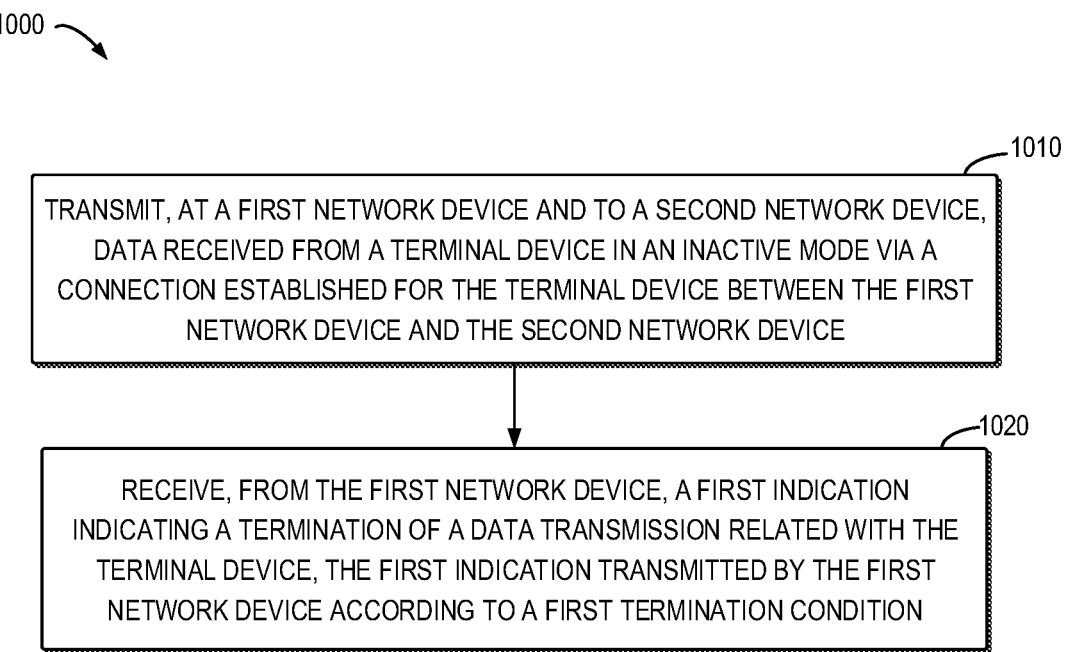

1010

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

1020

RECEIVE, FROM THE FIRST NETWORK DEVICE, A FIRST INDICATION INDICATING A TERMINATION OF A DATA TRANSMISSION RELATED WITH THE TERMINAL DEVICE, THE FIRST INDICATION TRANSMITTED BY THE FIRST NETWORK DEVICE ACCORDING TO A FIRST TERMINATION CONDITION

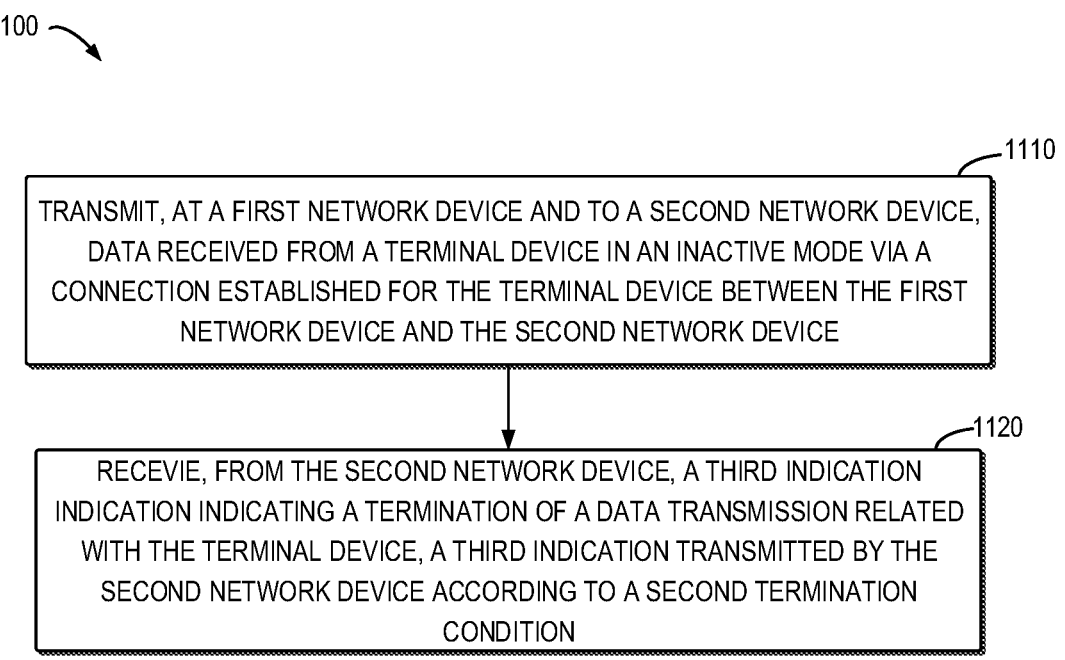

1110

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

1120

RECEVIE, FROM THE SECOND NETWORK DEVICE, A THIRD INDICATION INDICATION INDICATING A TERMINATION OF A DATA TRANSMISSION RELATED WITH THE TERMINAL DEVICE, A THIRD INDICATION TRANSMITTED BY THE SECOND NETWORK DEVICE ACCORDING TO A SECOND TERMINATION CONDITION

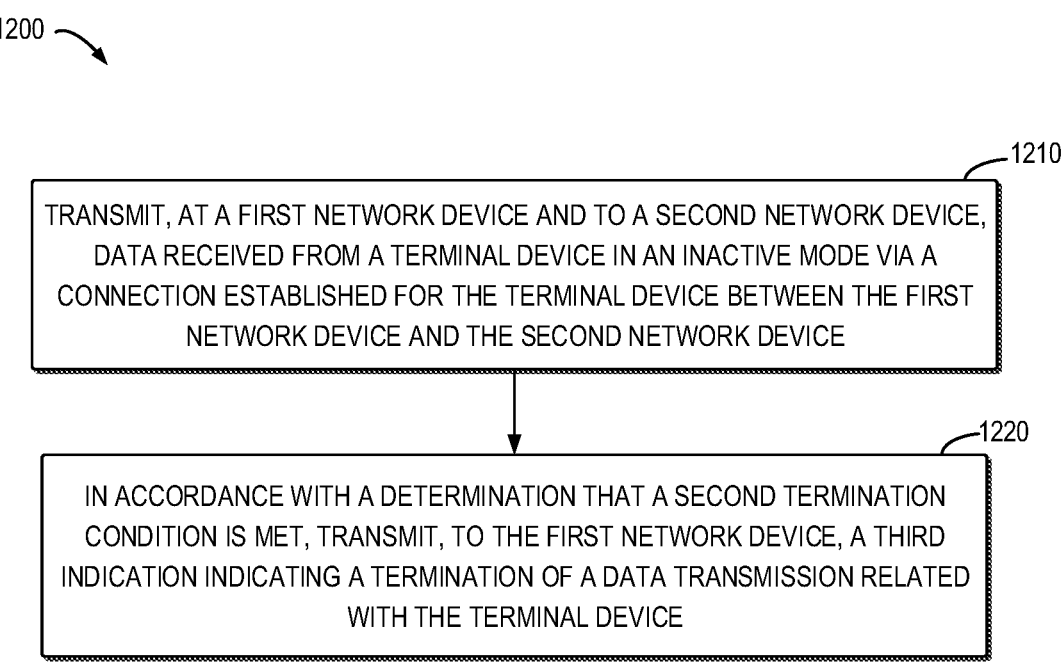

1210

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

1220

IN ACCORDANCE WITH A DETERMINATION THAT A SECOND TERMINATION CONDITION IS MET, TRANSMIT, TO THE FIRST NETWORK DEVICE, A THIRD INDICATION INDICATING A TERMINATION OF A DATA TRANSMISSION RELATED WITH THE TERMINAL DEVICE

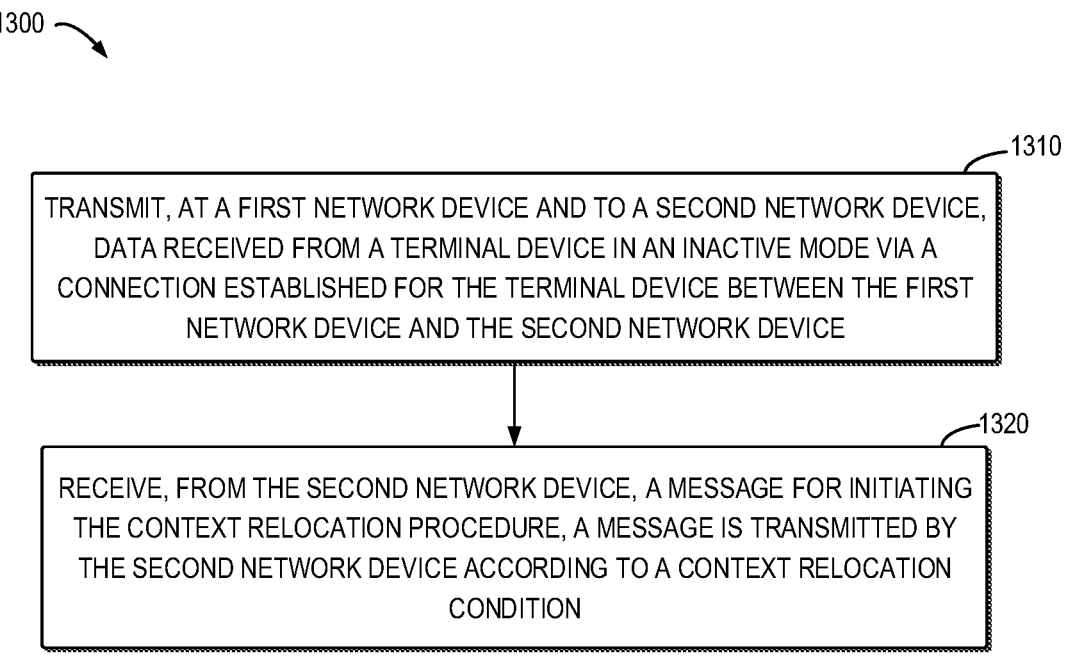

1310

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

1320

RECEIVE, FROM THE SECOND NETWORK DEVICE, A MESSAGE FOR INITIATING THE CONTEXT RELOCATION PROCEDURE, A MESSAGE IS TRANSMITTED BY THE SECOND NETWORK DEVICE ACCORDING TO A CONTEXT RELOCATION CONDITION

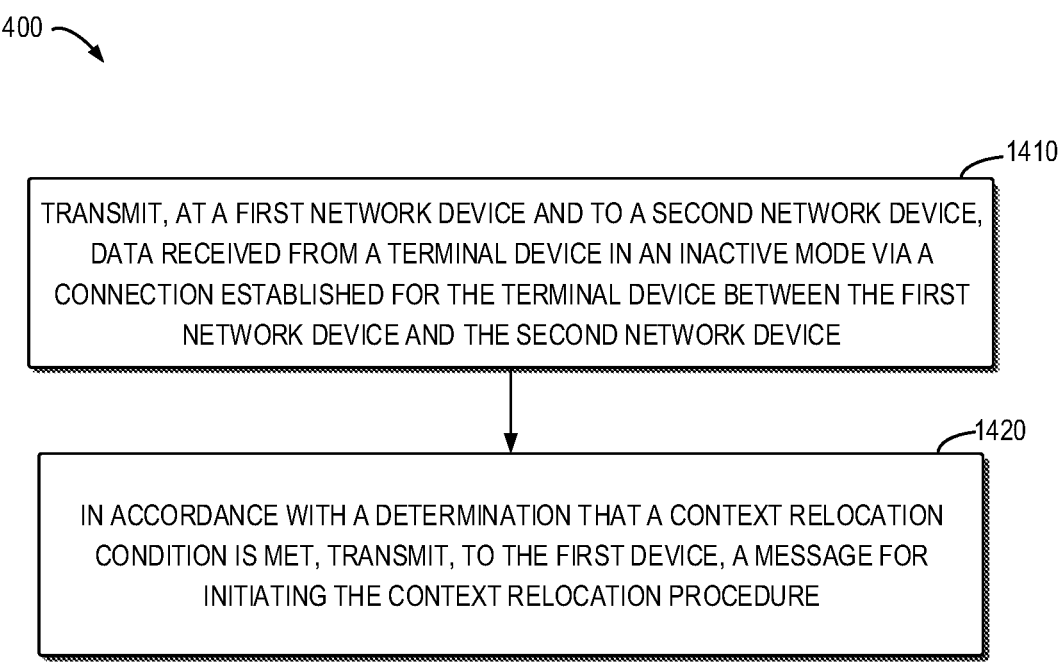

1410

TRANSMIT, AT A FIRST NETWORK DEVICE AND TO A SECOND NETWORK DEVICE, DATA RECEIVED FROM A TERMINAL DEVICE IN AN INACTIVE MODE VIA A CONNECTION ESTABLISHED FOR THE TERMINAL DEVICE BETWEEN THE FIRST NETWORK DEVICE AND THE SECOND NETWORK DEVICE

1420

IN ACCORDANCE WITH A DETERMINATION THAT A CONTEXT RELOCATION CONDITION IS MET, TRANSMIT, TO THE FIRST DEVICE, A MESSAGE FOR INITIATING THE CONTEXT RELOCATION PROCEDURE

METHODS, DEVICES, AND MEDIUM FOR COMMUNICATION

CROSS REFERENCE TO RELATED APPLICATIONS

This application is a National Stage of International Application No. PCT/CN2021/071453 filed Jan. 13, 2021.

FIELD

Embodiments of the present disclosure generally relate to the field of telecommunication, and in particular, to methods, devices, and medium for communication.

BACKGROUND

Power consumption of a terminal device is a focus in current wireless communication system. In order to reduce power consumption of the terminal device, it is proposed that the terminal device may be configured in some power saving modes (such as, inactive mode). As for a terminal device in an inactive mode, normal data transmissions are proposed to be suspended. Generally speaking, if the terminal device in the inactive mode needs to perform normal transmission with a network device, the terminal device has to resume a connection (i.e., wake up and transform into a connected mode).

In order to further reduce power consumption, a solution for enabling small data transmission (SDT) for the terminal device in the inactive mode is proposed by a work item of the third Generation Partnership Project (3GPP). By using SDT, the terminal device in the inactive mode may maintain the inactive mode while enabling an uplink (UL) transmission (i.e., UL data). Further, in a wireless communication system, the terminal device usually moves over time, which results that the network device serving the terminal device may change. By far, there are still many pending issues for such scenario needed to be discussed and stipulated.

SUMMARY

In general, example embodiments of the present disclosure provide a solution of UP transmission (i.e., UL data) for a device in an inactive mode. Embodiments that do not fall under the scope of the claims, if any, are to be interpreted as examples useful for understanding various embodiments of the disclosure.

In a first aspect, there is provided a method of communication. The method comprises transmitting, at a first network device and to a second network device, data received from a terminal device in an inactive mode via a connection established for the terminal device between the first network device and the second network device. The method further comprises in accordance with a determination that a first condition is met, transmitting, to the second network device, a first indication indicating a termination of a data transmission related with the terminal device.

In a second aspect, there is provided a method of communication. The method comprises receiving, at a second network device and from a first network device, a data received by the first network device and from a terminal device in an inactive mode via a connection established for the terminal device between the first network device and the second network device. The method further comprises receiving, from the first network device, a first indication indicating a termination of a data transmission related with the terminal device, the first indication transmitted by the first network device according to a first condition.

In a third aspect, there is provided a method of communication. The method comprises transmitting, at a first network device and to a second network device, data received from a terminal device in an inactive mode via a connection established for the terminal device between the first network device and the second network device. The method further comprises receiving, from the second network device, a third indication indicating a termination of a data transmission related with the terminal device, a third indication transmitted by the second network device according to a second condition.

In a fourth aspect, there is provided a method of communication. The method comprises receiving, at a second network device and from a first network device, a data received by the first network device and from a terminal device in an inactive mode via a connection established for the terminal device between the first network device and the second network device. The method further comprises in accordance with a determination that a second condition is met, transmitting, to the first network device, a third indication indicating a termination of a data transmission related with the terminal device.

In a fifth aspect, there is provided a method of communication. The method comprises transmitting, at a first network device and to a second network device, data received from a terminal device in an inactive mode via a connection established for the terminal device between the first network device and the second network device. The method further comprises receiving, from the second network device, a message for initiating the context relocation procedure, a message transmitted by the second network device according to a third condition.

In a sixth aspect, there is provided a method of communication. The method comprises receiving, at a second network device and from a first network device, a data received by the first network device and from a terminal device in an inactive mode via a connection established for the terminal device between the first network device and the second network device. The method further comprises in accordance with a determination that a third condition is met, transmitting, to the first network device, a message for initiating the context relocation procedure.

In a seventh aspect, there is provided a first network device. The first network device includes a processing unit; and a memory coupled to the processing unit and storing instructions thereon, the instructions, when executed by the processing unit, causing the device to perform the method according to the first aspect.

In an eighth aspect, there is provided a second network device. The second network device includes a processing unit; and a memory coupled to the processing unit and storing instructions thereon, the instructions, when executed by the processing unit, causing the device to perform the method according to the second aspect.

In a ninth aspect, there is provided a first network device. The first network device includes a processing unit; and a memory coupled to the processing unit and storing instructions thereon, the instructions, when executed by the processing unit, causing the device to perform the method according to the third aspect.

In a tenth aspect, there is provided a second network device. The second network device includes a processing unit; and a memory coupled to the processing unit and storing instructions thereon, the instructions, when executed by the processing unit, causing the device to perform the method according to the fourth aspect.

In an eleventh aspect, there is provided a first network device. The first network device includes a processing unit; and a memory coupled to the processing unit and storing instructions thereon, the instructions, when executed by the processing unit, causing the device to perform the method according to the fifth aspect.

In a twelfth aspect, there is provided a second network device. The second network device includes a processing unit; and a memory coupled to the processing unit and storing instructions thereon, the instructions, when executed by the processing unit, causing the device to perform the method according to the sixth aspect.

In a thirteenth aspect, there is provided a computer readable medium having instructions stored thereon, the instructions, when executed on at least one processor, causing the at least one processor to carry out the method according to the first aspect.

In a fourteenth aspect, there is provided a computer readable medium having instructions stored thereon, the instructions, when executed on at least one processor, causing the at least one processor to carry out the method according to the second aspect.

In a fifteenth aspect, there is provided a computer readable medium having instructions stored thereon, the instructions, when executed on at least one processor, causing the at least one processor to carry out the method according to the third aspect.

In a sixteenth aspect, there is provided a computer readable medium having instructions stored thereon, the instructions, when executed on at least one processor, causing the at least one processor to carry out the method according to the fourth aspect.

In a seventeenth aspect, there is provided a computer readable medium having instructions stored thereon, the instructions, when executed on at least one processor, causing the at least one processor to carry out the method according to the fifth aspect.

In an eighteenth aspect, there is provided a computer readable medium having instructions stored thereon, the instructions, when executed on at least one processor, causing the at least one processor to carry out the method according to the sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIG. 9 illustrates an example method of communication implemented at a first network device in accordance with some embodiments of the present disclosure;

FIG. 10 illustrates an example method of communication implemented at a second network device in accordance with some embodiments of the present disclosure;

FIG. 11 illustrates a further example method of communication implemented at a first network device in accordance with some embodiments of the present disclosure;

FIG. 12 illustrates a further example method of communication implemented at a second network device in accordance with some embodiments of the present disclosure;

FIG. 13 illustrates another example method of communication implemented at a first network device in accordance with some embodiments of the present disclosure;

FIG. 14 illustrates another example method of communication implemented at a second network device in accordance with some embodiments of the present disclosure.

Throughout the drawings, the same or similar reference numerals represent the same or similar element.

DETAILED DESCRIPTION

Figure 1:
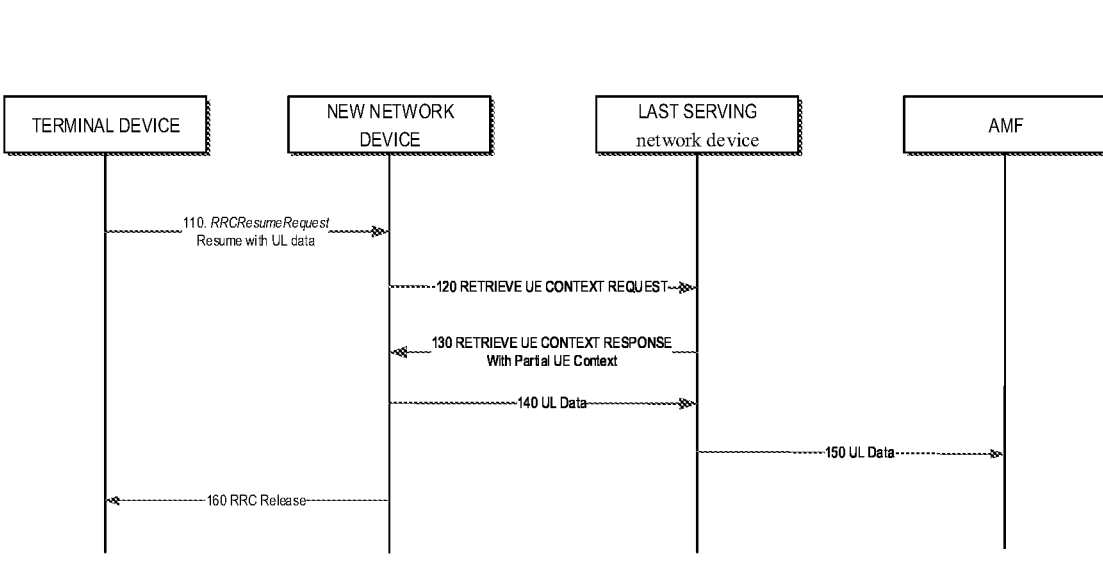
FIG. 1 illustrates a conventional signaling flow of SDT without a context relocation procedure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "core device" refers to any device or entity that provides access and mobility management function (AMF), session management function (SMF), user plane function (UPF), etc. By way of example rather than limitation, the core device may be an AMF, a SMF, a UPF, etc. In other embodiments, the core device may be any other suitable device or entity.

As used herein, the term "end marker" refers to one message between the two ends/devices/elements of the user plane of the interfaces, such as, Iu, Gn, Gp, S1-U, S11-U, S2a, S2b, S4, S5, S8, S12, X2, M1, Sn, Xn, N3 and N9. By way of example rather than limitation, the end marker may be a GPRS Tunnel Protocol-user plane (GPT-U) end marker.

As used herein, the terms "UL transmission", "SDT" and "UL data" are equivalent with each other.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

As discussed above, in order to reduce power consumption for a terminal device in the wireless communication, the terminal device may be configured in some power saving modes. For example, a Radio Resource Control (RRC) inactive mode has been proposed and defined by a work item of the 3GPP. Further, as discussed above, in order to further reduce power consumption, a solution for enabling SDT for the terminal device in the RRC inactive mode is proposed by a work item of the 3GPP, such that the terminal device in the inactive RRC mode may maintaining the inactive RRC mode while enabling a data transmission. One proposed solution for enabling SDT is performed by using random access channel (RACH) procedure including 2-step RACH and 4-step RACH (also referred to as RACH-based scheme). More specifically, SDT may be transmitted via message A of 2-step RACH and message 3 of 4-step RACH to the network device by the terminal device in an inactive mode.

Some example application scenarios of SDT for a smart terminal device may include, but not limited to the following:

Traffic/data/packet from instant messaging services (for example, whatsapp, QQ, wechat, MSN, and the like);

Heart-beat/keep-alive traffic/data/packet from some applications (for example, instant application, email application, and the like); and Push notifications from various applications.

Some example application scenarios of SDT for a non-smart terminal device may include, but not limited to the following:

Traffic/data/packet from wearables (for example, periodic positioning information, reference signal, and the like);

Periodic or non-Periodic traffic/data/packet from sensors (for example, temperature sample, pressure sample, and the parameter from industrial wireless sensor networks); and Periodic meter readings from smart mete device and smart meter network device.

In addition, regarding the SDT, Uplink/Downlink (UL/DL) transmission(s) following a UL SDT (also referred to as subsequent transmission(s) hereafter) without transitioning to RRC connected mode may be supported. In addition, the terminal device may be possible to send multiple UL and DL packets as part of the same SDT mechanism and without transitioning to RRC connected mode on dedicated grant when the terminal device is in the RRC inactive mode.

Besides the above, as discussed in a wireless communication system, the terminal usually moves over time, which results that the network device serving the terminal device may change. The RACH-based scheme for SDT may be supported with and without a context relocation procedure. FIG. 1 is a conventional signaling flow 100 of SDT without a context relocation procedure which has been proposed for performing SDT transmission without content relocation.

In embodiments described with reference to FIG. 1, the term "last serving network device" refers to a network device that maintains the context for the terminal device, where the context may be used be for such as generating a RRC release message for the terminal device 230, or initiating a context relocating procedure for the terminal device 230, and the term "new network device" refers to a network device of the camped cell of the terminal device 230.

As illustrated in FIG. 1, a terminal device is in the RRC inactive mode currently, and needs to transmit UL data to the network device. The terminal device transmits 110 a RRC resume request (such as, in message A of 2-step RACH or message 3 of 4-step RACH) to the new network device. Further, the UL data is transmitted to the first network device 220-1 together with the RRC resume request. The new network device transmits 120 retrieve UE context request to the last serving network device, and the last serving network device responds 130 with a retrieve UE context response, where the retrieve UE context response may carry partial context for the terminal device. After that, the new network device transmits 140 the UL data to the last serving network device, and the last serving network device transmits 150 the UP data to the AMF. After that, the new network device may transmit 160 a RRC release message to the terminal device.

From the above, it can be seen that, the above proposed signaling flow merely discuss how to transmit one-shot SDT. Further the above proposed signaling flow fails to discuss how to terminate the connection between the new network device and the last serving network device. As discussed, UL/DL transmission (i.e., UL/DL data) following the UL data (i.e., subsequent UL/DL transmission) should be supported. Therefore, regarding the subsequent DL transmission, as the connection between the new network device and the lasting serving network device is not terminated, the last serving network device may forward the subsequent DL data to the new network device, then the new network device will be confused about how to process the subsequent DL data. Regarding the subsequent UL data, as the connection between the new network device and the lasting serving network device is not terminated and the new network device may continue to transmit to the subsequent UL data to the last serving. However, if there are many UL transmissions, the subsequent UL transmission would become a burden for the last serving network device.

Therefore, there are still some issues needed to be discussed and stipulated. Especially, it is desirable to propose and discuss how to terminate the connection between the new network device and the last serving network device, and how to process the UE content when there are many subsequent transmissions (i.e., UL/DL data) for the terminal device in the inactive mode (such as, RRC inactive mode).

According to some example embodiments of the present disclosure, there is proposed a solution for UP transmission of a terminal device in an inactive mode. In this solution, a first network device (such as, a new network device) and a second network device (such as, a last serving network device) may terminates the connection between the first network device and the network device according to their respective termination condition. In this way, as the connection between the first network device and the network device has been terminated suitable, the subsequent DL data will not be transmitted to the first network device thereby. Further, the first network device may also determine whether to initiate a context relocation procedure for a terminal device during a UP transmission (including subsequent UP data) procedure or not according to a third condition. In this way, the second network device may determine whether to initiate a context relocation procedure dynamically and timely if the subsequent transmission (including subsequent UL data and DL data) becomes a burden for the second network device.

Example Environment

Figure 2:
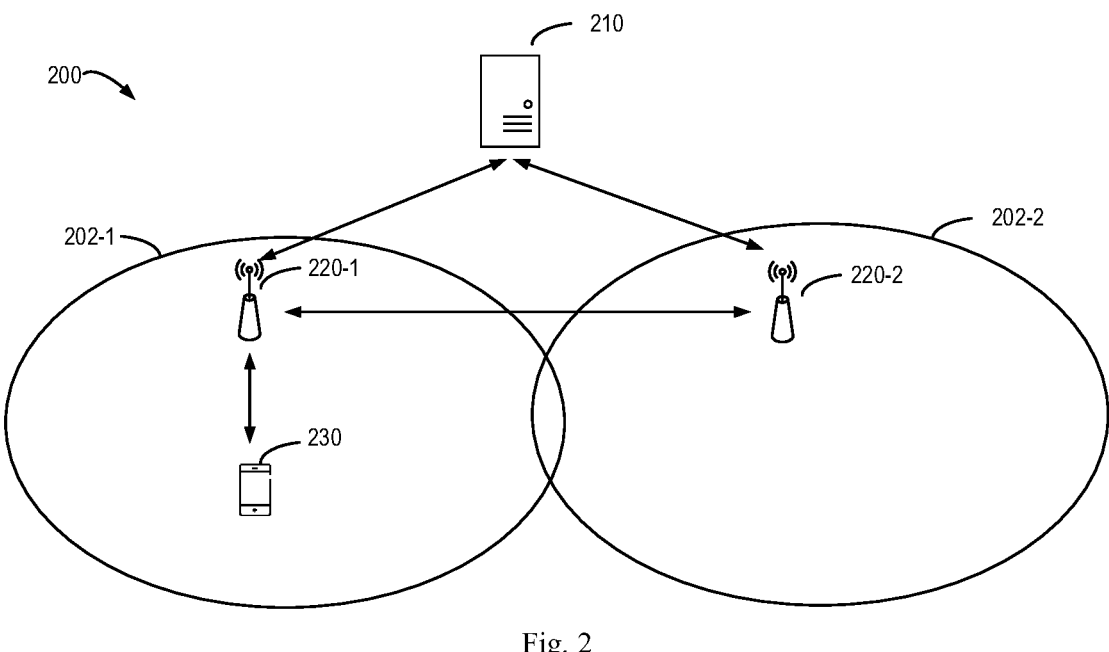
FIG. 2 illustrates an example communication environment in which example embodiments of the present disclosure can be implemented.

FIG. 2 shows an example communication environment 200 in which example embodiments of the present disclosure can be implemented.

In the communication environment 200, one or more network devices 220-1 and 220-2 (collectively referred to as network devices 220) can communicate with a core device 210 (such as, an UFP, an AMF, and the like). The one or more network devices 220-1 and 220-2 can provide services to a terminal device 230 and the serving areas of the network devices 220-1 and 220-2 are referred as cells 202-1 and 202-2 (collectively or individually referred to as cells 202). For purpose of discussion, the network device 220-1 is referred to as the first network device 220-1, and the network device 220-2 is referred to as the second network device 220-2. Further, the first network device 202-1 and the second network device 220-2 can communicate with each other.

In the environment 100, a link from the first network device 202-1 or the second network device 220-2 to the terminal device 230 is referred to as a DL, while a link from the terminal device 2300 to the first network device 202-1 or the second network device 220-2 is referred to as an UL. In DL, the first network device 202-1 or the second network device 220-2 is a TX device (or a transmitter) and the terminal device 230 is a RX device (or a receiver). In UP, the terminal device 230 is a transmitting (TX) device (or a transmitter) and the first network device 202-1 or the second network device 220-2 is a receiving (RX) device (or a receiver).

In addition, in the example of FIG. 2, the terminal device 230 may move over time. As illustrated in FIG. 2, the terminal device 230 locates at different positions over time. Further, the terminal device 230 may be in different modes, such as, connected mode and inactive mode. In the specific example of FIG. 2, the second network device 220-2 (also referred to as "a last serving network device" or "anchor network device" sometimes) maintains the context of the terminal device. Further, the terminal device 230 is in the inactive mode and camped on the first network device 220-1 (also referred to as "a new network device" sometimes).

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

It is to be understood that the numbers their connections of first network device, second network device, core device, terminal device and cell are only for the purpose of illustration without suggesting any limitations. The communication environment 100 may include any suitable first network device, second network device, core device, terminal device and cell adapted for implementing embodiments of the present disclosure. Although not shown, it is to be understood that one or more additional first network devices and second network devices may be located in the respective cells 202. It would also be appreciated that in some examples, only the homogeneous network deployment or only the heterogeneous network deployment may be included in the environment 200.

Figure 6A:
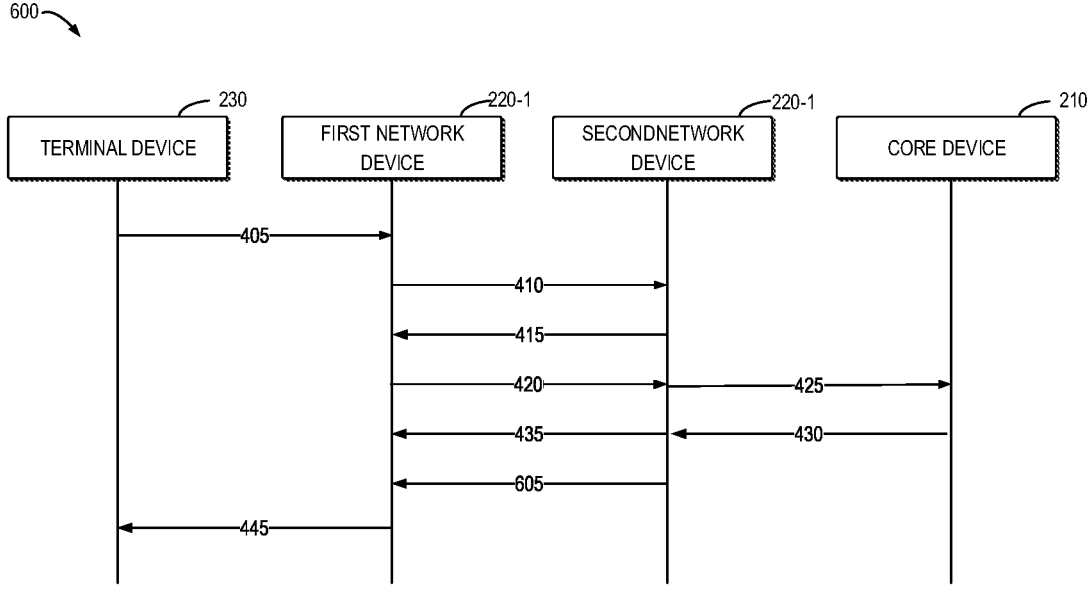
FIGS. 6A to 6C are further signaling charts illustrating processes for UL transmission of a terminal device in the inactive mode according to some embodiments of the present disclosure, respectively.
Figure 7:
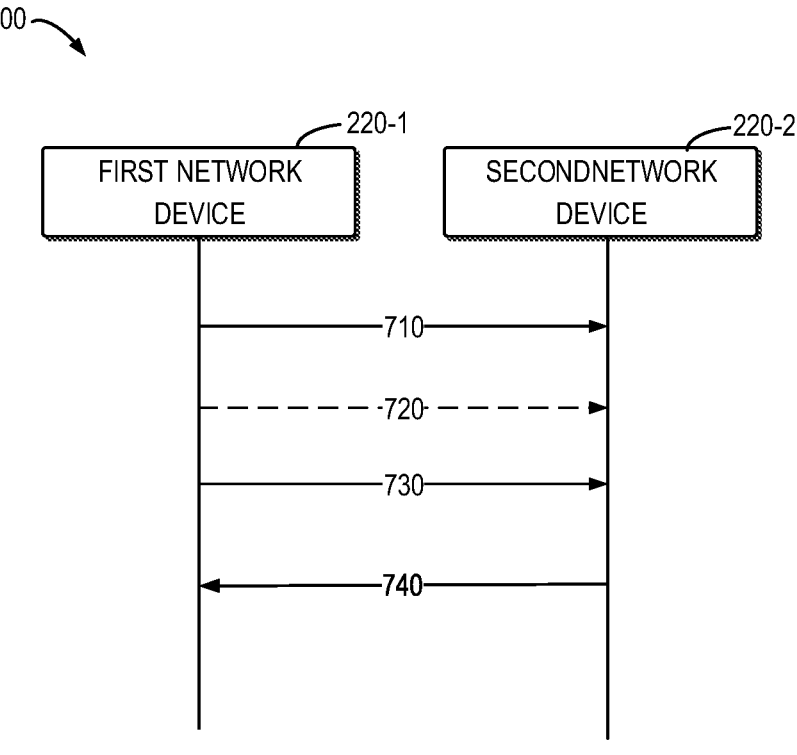
FIG. 7 is a further signaling chart illustrating process for UL transmission of a terminal device in the inactive mode according to some embodiments of the present disclosure.
Figure 8A:
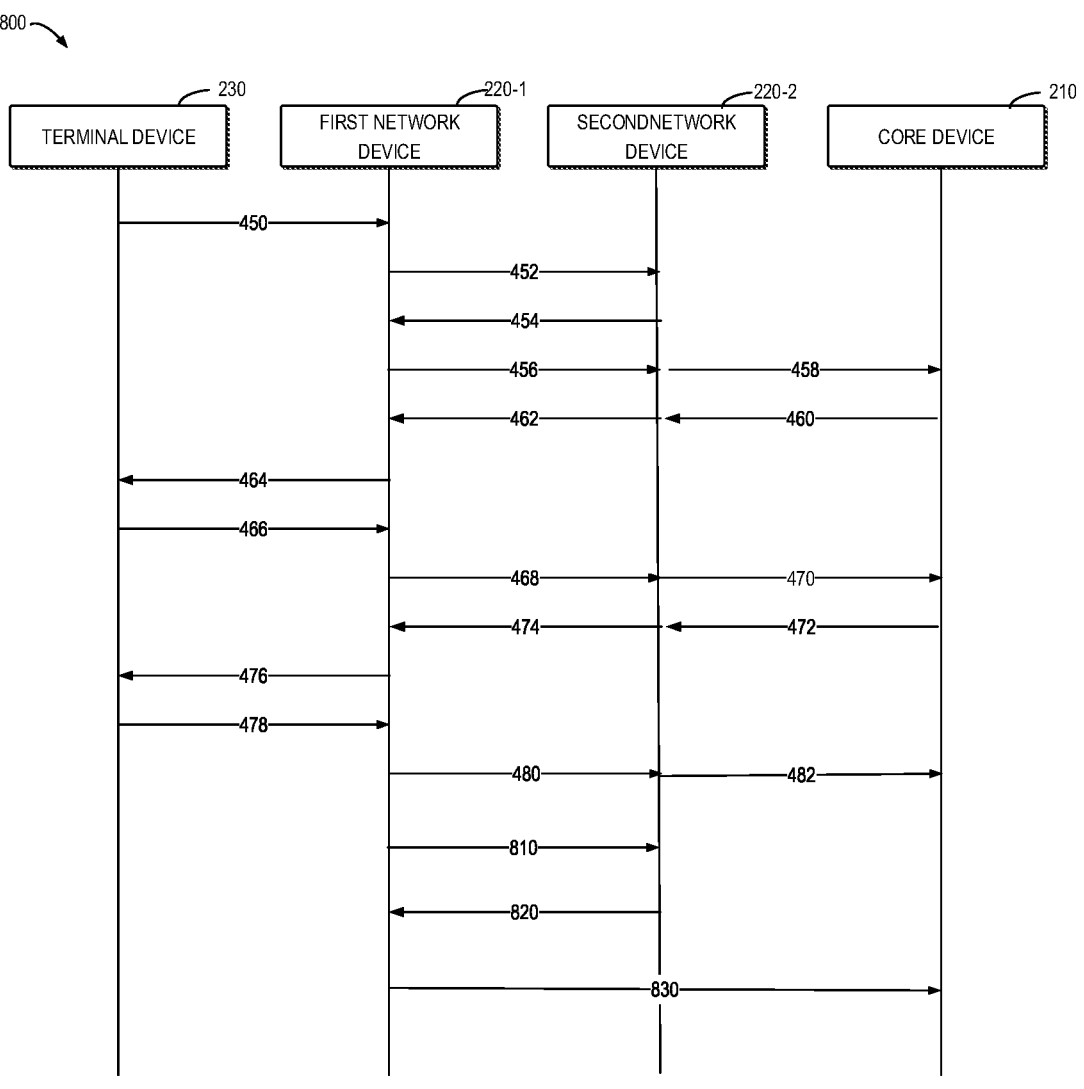
FIGS. 8A and 8B are further signaling charts illustrating processes for UL transmission of a terminal device in the inactive mode according to some embodiments of the present disclosure, respectively.
Figure 8B:
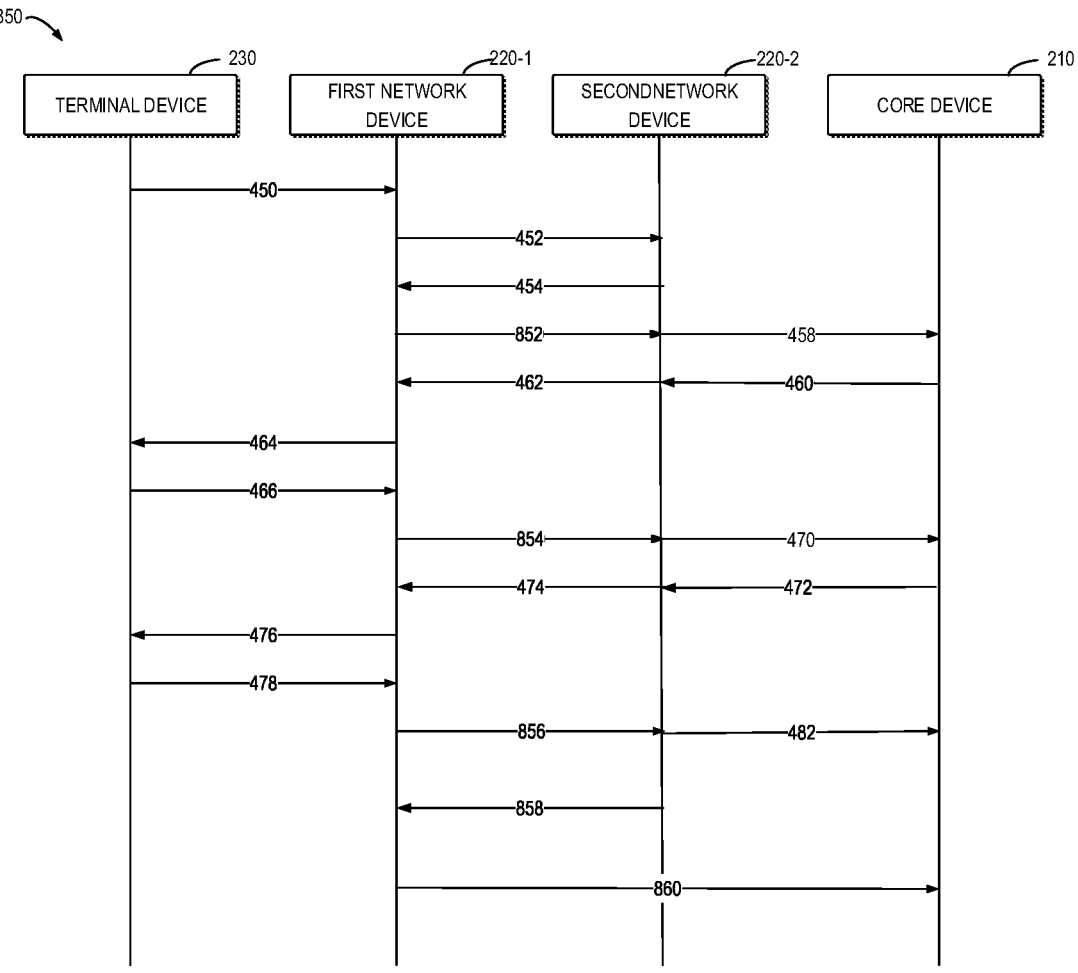

Example embodiments of the present disclosure will be described in detail below with reference to the accompanying drawings. More specifically, FIG. 3 and FIG. 4A describe the processes that the first network device 220-1 initiates to terminate the connection between the first network device 220-1 and the second network device 220-2. FIG. 5, and FIGS. 6A to 6C describe the processes that the second network device 220-2 initiates to terminate the connection between the first network device 220-1 and the second network device 220-2, respectively. FIG. 7 and FIGS. 8A and 8B describe the processes that the second network 220-2 device initiates a content relocation procedure for the terminal device during a UP transmission, respectively.

Further, in the following descriptions, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Figure 3:
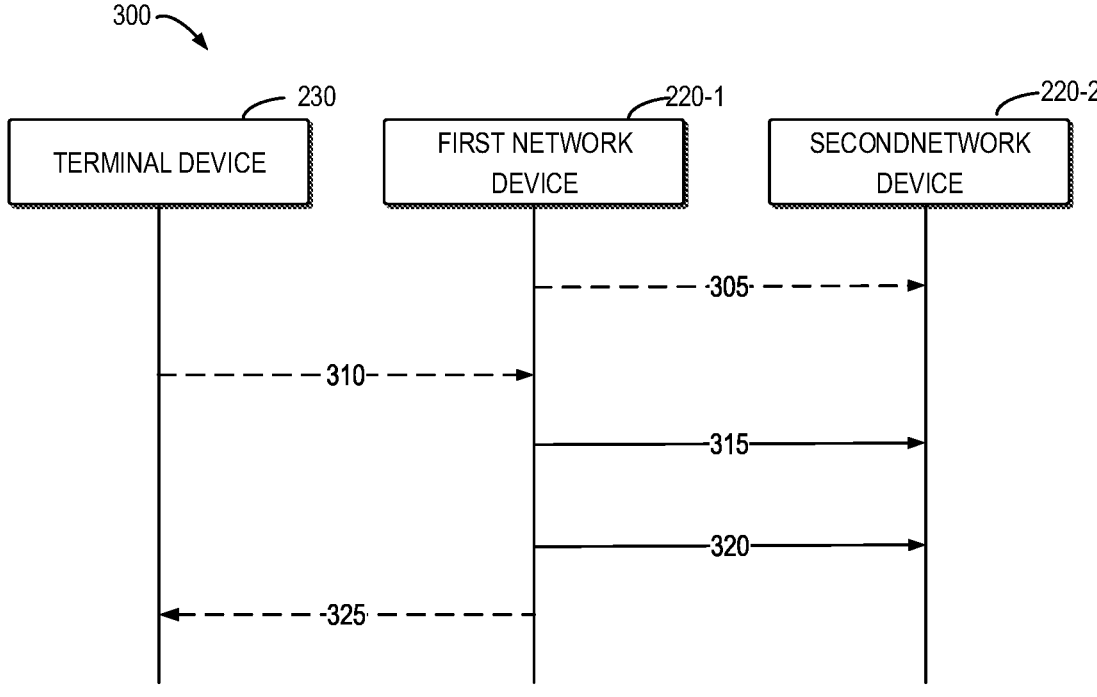
FIG. 3 is a signaling chart illustrating process for UL transmission of a terminal device in the inactive mode according to some embodiments of the present disclosure.

Example Processes that the First Network Device Initiates to Terminate the Connection Reference is now made to FIG. 3, which shows a signaling flow 300 for UL transmission (i.e., UL data) of a terminal device in an inactive mode according to some embodiments of the present disclosure. For the purpose of discussion, the signaling flow 300 will be described with reference to FIG. 2. The signaling flow 300 may involve a first network device 220-1, a second network device 220-2 and a terminal device 230.

In the example of FIG. 3, the first network device 220-1 receives UL data from the terminal devise 230, and the first network device 220-1 transmits 315 the UL data via a connection established for the terminal device 230 between the first network device 220-1 and the second network device 220-2. Further, in addition being a one-shot UL data, the UL data also may be a subsequent UL data. More specifically, the first network device 220-2 may transmit 305 a further UL data to the second network device 220-2 first, and then transmits 315 the UL data to the second network device 220-2 subsequently.

In operation, if the first network device 220-1 determines a first condition is met, the first network device 220-1 may transmit 320 a first indication indicating a termination of a data transmission related with the terminal device 230. As a result, the connection (such as, a GPT-U tunnel) establish for the terminal device 230 between the first network device 220-1 and the second network device 220-2 may be terminated thereby. The first condition is used by the first network device for determining whether to terminate a data transmission related with the terminal device 230 or not. In one embodiment, the first indication is to indicate a termination of a transmission in the inactive mode. The transmission may include at least one of UL transmission and DL transmission.

In some example embodiments, terminating the data transmission refers to terminating the data transmission procedure (such as, SDT, or other UL/DL transmission procedures) related with the terminal device in the active mode. Alternatively, or in addition, in some example embodiments, terminating the data transmission refers to terminating the current transmission procedure (such as, SDT, or other UL/DL transmission procedures). Alternatively, or in addition, in some example embodiments, terminating the data connection may be implemented by releasing related protocol stack(s) and configuration. It is to be understood that the above illustrated manners for implementing of terminating the data transmission are only for the purpose of illustration without suggesting any limitations. In other example embodiments, any suitable manner may be used for terminating the data transmission related with the terminal device 230.

Then, the second network device 220-2 may handle the connection after receiving the first indication, such as, tear down the connection between the first network device 220-1 and the second network device 220-2, release related protocol stack(s) and configuration, terminate the related transmission (for example, SDT), stop forwarding DL data to the first network device 220-1, and the like. Meanwhile, the first network device 220-1 may transmit 325 a RRC release message to the terminal device 230.

In this way, as the second network device 220-2 can be informed that the connection between the first network device 220-1 and the second network device 220-2 has been terminated, if the second network device 220-2 receives DL data for the terminal device, the second network device 220-2 will not forward the DL data to the first network device 220-1 anymore. Instead, the second network device 220-2 may initiate a paging procedure for the terminal device 230, and then the DL data may be transmitted to the terminal device 230 accordingly.

In some example embodiments, the first indication may be transmitted via a signalling transmitted over an Xn or X2 interface. Alternatively, the first indication may be transmitted via at least one end marker packet.

It is to be understood that the above illustrated signaling or packet for transmitting the first indication are only for the purpose of illustration without suggesting any limitations. In other example embodiments, any suitable message or signalling may be used for transmitting the first indication. In this way, the first indication may be transmitted to the second network device 220-2 flexibly.

In some example embodiments, if the first network device 220-1 receives 310 the data from the terminal device 230, where the data is absent of information about an amount of data to be transmitted at the terminal device 230, the first network device 220-1 determines the first condition is met. For example, the first network device 220-1 receives a data being absent of a buffer state report (BSR). Alternatively, in some example embodiments, if the first network device 220-1 receives 310 a data from the terminal device 230, where the data comprises a second indication that indicates there is no more data to be transmitted at the terminal device 230, the first network device 220-1 determines the first condition is met. For example, the first network device 220-1 receives a data carrying a BSR with value 0. Additionally, in some example embodiments, the data may be transmitted via a RRC resume message (such as, a message A of 2-step RACH or message 3 of 4-step RACH). Alternatively, in some example embodiments, the data is transmitted via a granted UL resource.

In this way, the first network device 220-1 may terminate the connection between the first network device 220-1 and the second network device 220-2 more suitable.

To better describe the above process, some specific examples are provided as below only for the purpose of illustration without suggesting any limitations.

Figure 4A:
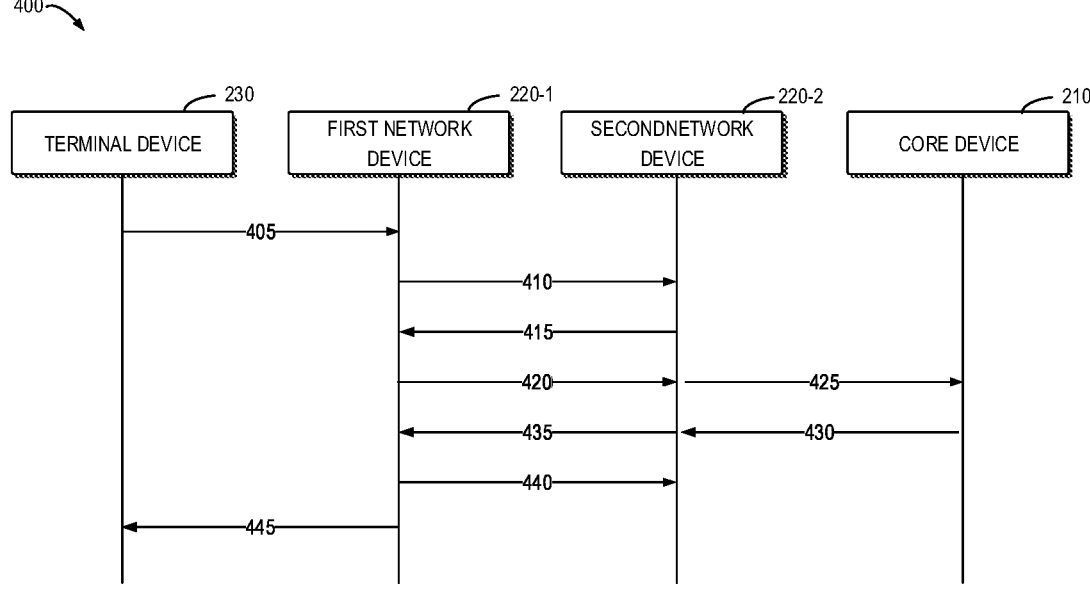
FIGS. 4A and 4B are signaling charts illustrating process for UL transmission of a terminal device in the inactive mode according to some embodiments of the present disclosure, respectively.

A specific example for the scenario of one-shot UL transmission will be described by referring to FIG. 4A. FIG. 4A shows a signaling flow 400 for one-shot UL transmission of a terminal device 230 in the inactive mode according to some embodiments of the present disclosure. For the purpose of discussion, the signaling flow 400 will be described with reference to FIG. 2. The signaling flow 400 may involve a core device 210 (such as, UPF), a first network device 220-1, a second network device 220-2 and a terminal device 230.

In operation, the terminal device 405 transmits 405 a RRC resume request (such as, in message A of 2-step RACH or message 3 of 4-step RACH) to the first network device 220-1, and the RRC resume request. Further, a UL data is transmitted to the first network device 220-1. In addition, no information about an amount of data to be transmitted at the terminal device (such as, BSR) is indicated. In other words, neither the message nor the data transmitted by the terminal device 230 comprises information about an amount of data to be transmitted at the terminal device (such as, BSR). Then, the first network device 220-1 may determine that there is no more data to be transmitted at the terminal device 230, which means that the first network device 220-1 may terminate the connection between the first network device 220-1 and the second network device 220-2 after the transmission of the UL data. For example, the first network device may determine to terminate the UP transmission procedure (such as, SDT), release the related protocol stack(s) and configuration, and the like.

The first network device 220-1 transmits 410 a retrieve UE context request to the second network device 220-2, where the retrieve UE context request carried the BSR with value 0, which indicates that there is no more data related to the terminal device 230 needed to be transmitted. The second network device 220-2 responds 415 with a retrieve UE context response/failure, where the retrieve UE context response/failure carries a RRC release message for the terminal device 230.

After that, the first network device 220-1 transmits 420 the UL data to the second network device 220-2, and the second network device 220-2 transmits 425 the UL data to the core device 210. In the specific example of FIG. 4A, the second network device 220-2 also receives 430 DL data for the terminal device 230 from the core device 210, and the second network device 220-2 transmits 435 the DL data to the first network device 220-1.

Then, the first network device 220-1 transmits 440 a first indication indicating a termination of a data transmission related with the terminal device 230 to the second network device 220-2 via an Xn/N2 signaling or at least one end marker packet. Meanwhile, the first network device 220-1 transmits 445 a RRC release message to the terminal device 230. Further, the DL data for the terminal device 230 is transmitted to the terminal device 230 together or separately with the RRC release message.

After discussion for the scenario of the one-shot UL transmission, a specific example for the scenario of UP transmission comprising a subsequent UL transmission will be described by referring to FIG. 4B.

Figure 4B:
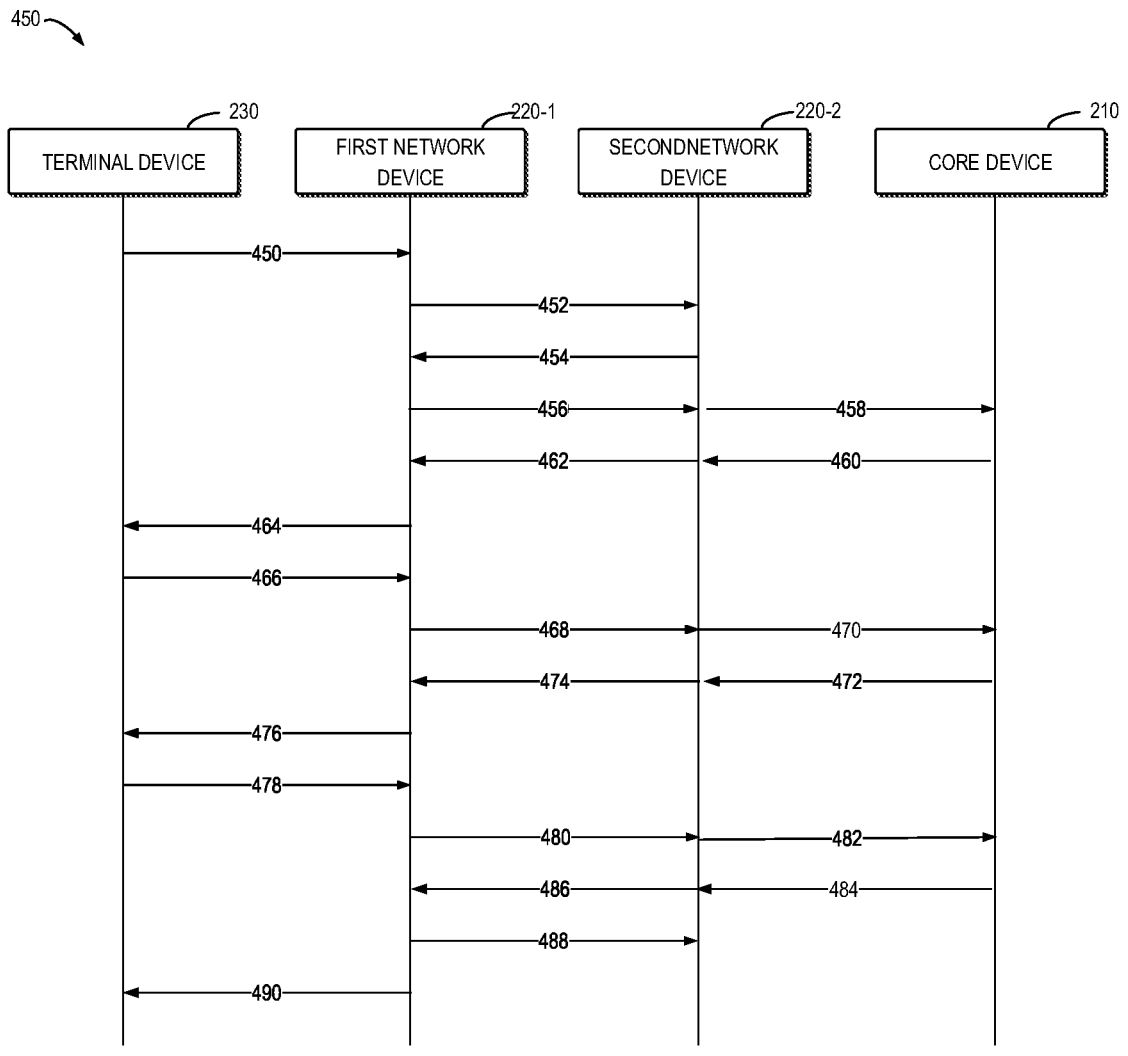

Reference is now made to FIG. 4B, which shows a signaling flow 450 the scenario of UP transmission comprising a subsequent UL transmission. For the purpose of discussion, the signaling flow 450 will be described with reference to FIG. 2. The signaling flow 450 may involve a core device 210 (such as, UPF), a first network device 220-1, a second network device 220-2 and a terminal device 230.

In operation, the terminal device 230 transmits 450 a RRC resume request (such as, in message A of 2-step RACH or message 3 of 4-step RACH) to the second network device 220-2. Further, a UL data is transmitted to the first network device 220-1. Further, information that there is still further UP data needed to be transmitted at the terminal device 230 may be indicated to the first network device 220-1. For example, the terminal device 230 transmits a BSR with a value of non-zero to the first network device 220-1.

According to the UL data, the first network device 220-1 may determine that in addition to the data comprised in the RRC resume request, there is still data to be transmitted at the terminal device 230, which means that the connection between the first network device 220-1 and the second network device 220-2 should not be terminated.

The first network device 220-1 transmits 452 a retrieve UE context request to the second network device 220-2. The second network device 220-2 responds 454 with a retrieve UE context response/failure which indicate that the UE context is not relocated, where the retrieve UE context response/failure optionally carries a RRC release message for the terminal device 230.

After that, the first network device 220-1 transmits 456 the UL data to the second network device 220-2, and the second network device 220-2 transmits 458 the UL data to the core device 210. In the specific of FIG. 4B, the second network device 220-2 also receives 460 DL data for the terminal device 230 from the core device 210, and the second network device 220-2 transmits 462 the DL data to the first network device 220-1.

As discussed above, the first network device 220-1 knows that there is still data to be transmitted at the terminal device 230. Therefore, the first network device 220-1 transmits 464 message about contention resolution to the terminal device 230, where the message optionally carries an indication of subsequent UP data and optionally carries a UL grant for the subsequent UP data. Further, the DL data may also be transmitted to the terminal device 230 optionally.

After receiving the UL grant, the terminal device 230 transmits 466 the subsequent UL data to the second network device 220-2. For this specific example of FIG. 4B, the terminal device 230 still has further subsequent UL data to be transmitted after transmitting the subsequent UL data. Therefore, the subsequent UL data comprises a BSR with value of non-zero. According to the subsequent UL data, the first network device 220-1 may determine that there is still a further subsequent UL data to be transmitted at the terminal device 230.

Then, the first network device 220-1 transmits 468 the subsequent UL data to the second network device 220-2, and the second network device 220-2 transmits 470 the subsequent UL data to the core device 210. In the specific example of FIG. 4B, the second network device 220-2 also receives 472 further DL data for the terminal device 230 from the core device 210, and the second network device 220-2 transmits 474 the further DL data to the first network device 220-1.

As discussed above, the first network device 220-1 knows that there is still further subsequent UP data to be transmitted at the terminal device 230. Therefore, the first network device 220-1 transmits 476 a further UL grant for the further subsequent UP data. More specifically, in the specific example of FIG. 4B, the UL grant is transmitted together with the further DL data.

Then, the terminal device 230 may transmit 478 the further subsequent UL data to the first network device 220-1 via the further UL grant. For the specific example of FIG. 4B, the further subsequent UL data is absent of information about an amount of data to be transmitted (such as, BSR) at the terminal device 230. According to the further subsequent UL data, the first network device 220-1 may determine that there is no more data to be transmitted at the terminal device 230, which means that the first network device 220-1 may terminate the connection between the first network device 220-1 and the second network device 220-2 after the transmission of the further subsequent UL data.

The first network device 220-1 transmits 480 the further subsequent UL data to the second network device 220-2, and the second network device 220-2 transmits 482 the further subsequent UL data to the core device 210. In the specific example of FIG. 4B, the second network device 220-2 also receives 484 another DL data for the terminal device 230 from the core device 210, and the second network device 220-2 transmits 486 the another DL data to the first network device 220-1.

Then, the first network device 220-1 transmits 488 the first indication indicating a termination of a data transmission related with the terminal device 230 to the second network device 220-2 via an Xn/N2 signaling or at least one end marker packet. Additionally, the second network device 220-1 may transmit the information for releasing RRC connection of the terminal device 230 to the first network device 220-1. The information may be transmitted via a signaling transmitted over an Xn or X2 interface. Meanwhile, the first network device 220-1 transmits 490 a RRC release message to the terminal device 230. Further, the another DL data is transmitted to the terminal device 230.

According to the above description, the processes that the first network 220-1 device initiates to terminate the connection between the first network device 220-1 and the second network device 220-2 has been fully discussed.

Figure 5:
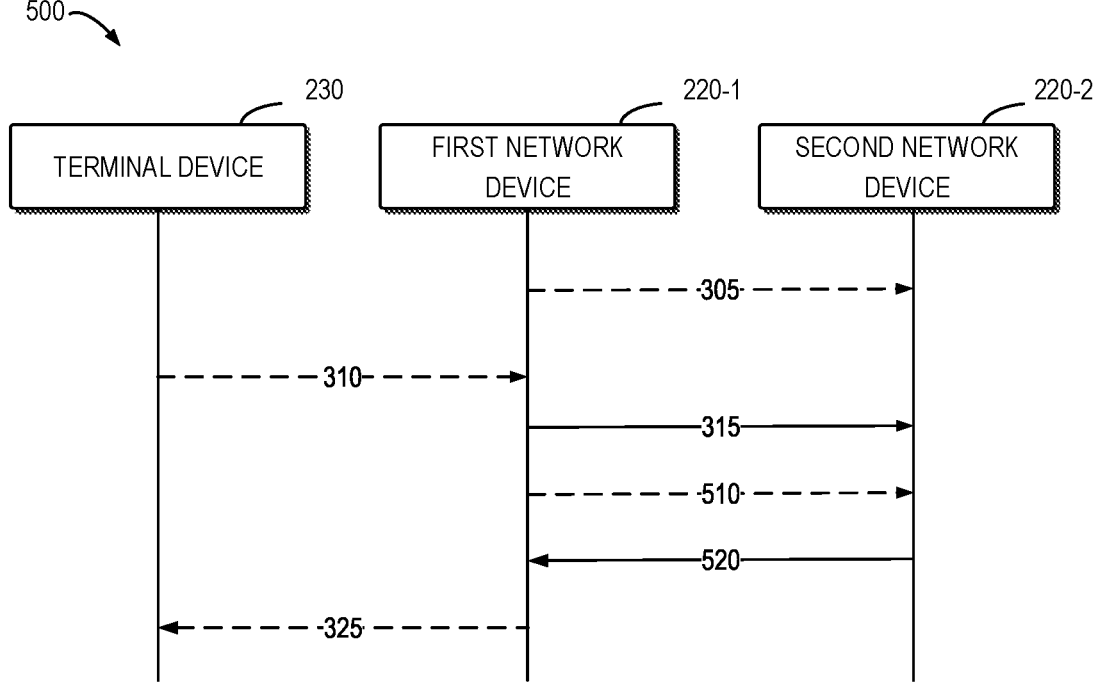
FIG. 5 is a further signaling chart illustrating process for UL transmission of a terminal device in the inactive mode according to some embodiments of the present disclosure.

Example Processes that the Second Network Device Initiates to Terminate the Connection Reference is now made to FIG. 5, which shows a signaling flow 500 for UL transmission of a terminal device in the inactive mode according to some embodiments of the present disclosure. For the purpose of discussion, the signaling flow 500 will be described with reference to FIG. 2. The signaling flow 500 may involve a first network device 220-1, a second network device 220-2 and a terminal device 230.

The signalling flow 500 shown in FIG. 5 is similar with the signalling flow 300 shown in FIG. 3, and the same operations/elements are labelled with same reference number. For the sake of brevity, the descriptions of the same operations/elements are omitted below.

In the example of FIG. 5, if the second network device 220-2 determines a second condition is met, the second network device 220-2 may transmit 520 a third indication indicating a termination of a data transmission related with the terminal device 230 to the second network device 220-2. As a result, the connection (such as, a GPT-U tunnel) establish for the terminal device 230 between the first network device 220-1 and the second network device 220-2 may be terminated thereby. Then, the first network device 220-1 may be informed that the connection between the first network device 220-1 and the second network device 220-2 has been terminated. The second condition is used by the second network device for determining whether to terminate a data transmission related with the terminal device 230 or not.

In this way, the second network device 220-2 may determine whether to terminate the connection or not. Therefore, if the second network device 220-2 receives DL data for the terminal device 230, the second network device 220-2 can determine whether to forward the DL data to the first network device 220-1 or initiate a paging procedure for the terminal device 230.

In some example embodiments, terminating the data transmission refers to terminating the data transmission procedure (such as, SDT, or other UL/DL transmission procedures) related with the terminal device in the active mode. Alternatively, or in addition, in some example embodiments, terminating the data transmission refers to terminating the current transmission procedure (such as, SDT, or other UL/DL transmission procedures). Alternatively, or in addition, in some example embodiments, terminating the data connection may be implemented by releasing related protocol stack(s) and configuration, and stop forwarding DL data to the network device 220-1. It is to be understood that the above illustrated manners for implementing of terminating the data transmission are only for the purpose of illustration without suggesting any limitations. In other example embodiments, any suitable manner may be used for terminating the data transmission related with the terminal device 230.

In some example embodiments, the third indication may be transmitted via a signalling transmitted over an Xn or X2 interface. Alternatively, the third indication may be transmitted via at least one end marker packet.

It is to be understood that the above illustrated signaling or packet for transmitting the third indication are only for the purpose of illustration without suggesting any limitations. In other example embodiments, any suitable message or signalling may be used for transmitting the third indication. In this way, the third indication may be transmitted to the second network device 220-2 flexibly.

In some example embodiments, the second network device 220-2 may transmit information for releasing RRC connection of the terminal device 230 together with the third indication. For example, a RRC release message of the terminal device 230 may be embedded into the signaling transmitted over an Xn or X2 interface for transmitting the third indication. In this way, the first network device 220-1 may obtain the information for releasing RRC connection of the terminal device 230 without any further overhead.

Additionally, in some example embodiments, if the second network device 220-2 receives a fourth indication from the first network device 220-1, where the fourth indication indicates that there is no more data related to the terminal device is to be transmitted, the second network device 220-2 determines the second condition is met, and transmits the third indication to the first network device 220-2 thereby. In this way, the second network device 220-2 may initiate to terminate the connection more suitable.

In some example embodiments, the fourth indication may be transmitted via a signalling transmitted over an Xn or X2 interface. Alternatively, the fourth indication may be transmitted via at least one end marker packet. Alternatively, the fourth indication may be transmitted via a header of data transmitted from first network device 220-1 to the second network device 220-2. For example, a "RAN Container" GTP-U extension header of GTP-U protocol may be used as the fourth indication, such that the buffer size information (such as, BSR) can be indicated.

It is to be understood that the above illustrated signaling or packet for transmitting the fourth indication are only for the purpose of illustration without suggesting any limitations. In other example embodiments, any suitable message or signalling may be used for transmitting the fourth indication. In this way, the fourth indication may be transmitted to the second network device 220-2 flexibly.

Alternatively, or in addition, if the second network device determines that there is no more DL data for the terminal device 230 needed to be transmitted, the second network device 220-2 may determine that the second condition is met and transmit the third indication thereby. In this way, the DL data may be transmitted to the terminal device without initiating a paging procedure.

Alternatively, or in addition, if the second network device does not receive further UL data from the first network device 210-1 for a period time, the second network device 202-2 also can determine that the second condition is met and transmit the third indication to the first network device 220-1 thereby. Therefore, the second network device 220-2 may determine whether to determine the connection according to the state of the UL transmission.

It is to be understood the second network device may determine whether the second condition is met according to any suitable criterion or their combination. In this way, the second network device 220-2 may terminate the connection between the first network device 220-1 and the second network device 220-2 more suitable.

To better describe the above process, some specific examples are provided as below only for the purpose of illustration without suggesting any limitations.

A specific example for the scenario of one-shot UL transmission will be described by referring to FIG. 6A first. FIG. 6A shows a signaling flow 600 for one-shot UL transmission of a terminal device in the inactive mode according to some embodiments of the present disclosure. For the purpose of discussion, the signaling flow 600 will be described with reference to FIG. 2. The signaling flow 600 may involve a core device 210 (such as, UPF), a first network device 220-1, a second network device 220-2 and a terminal device 230.

The signalling flow 600 shown in FIG. 6A is similar with the signalling flow 400 shown in FIG. 4A, and the same operations/elements are labelled with same reference number. For the sake of brevity, the descriptions of the same operations/elements are omitted below.

In the specific example of FIG. 6A, if the second network device 220-2 determines a second condition is met, the second network device 220-2 may transmit 605 an Xn message (which carries the third indication) to the first network device 220-1 to terminate the connection between the first network device 220-1 and the second network device 220-2. Further, in the specific example of FIG. 6A, the Xn message may carry information for releasing RRC connection of the terminal device. Alternatively, the third indication is transmitted via at least one end marker packet.

In addition, as discussed above, the first network device 220-1 transmits 410 the retrieve UE context request to the second network device 220-2, where the retrieve UE context request carried the BSR with value 0, which indicates that there is no more data related to terminal device 230 needed to be transmitted. Therefore, the BSR comprised in the retrieve UE context request may be considered as the fourth indication.

Through the above description, the process for one-shot scenario according to some embodiments of the present disclosure has been discussed. Then, specific examples for the scenario of UP transmission comprising a subsequent UL transmission will be described by referring to FIGS. 6B and 6C.

Figure 6B:
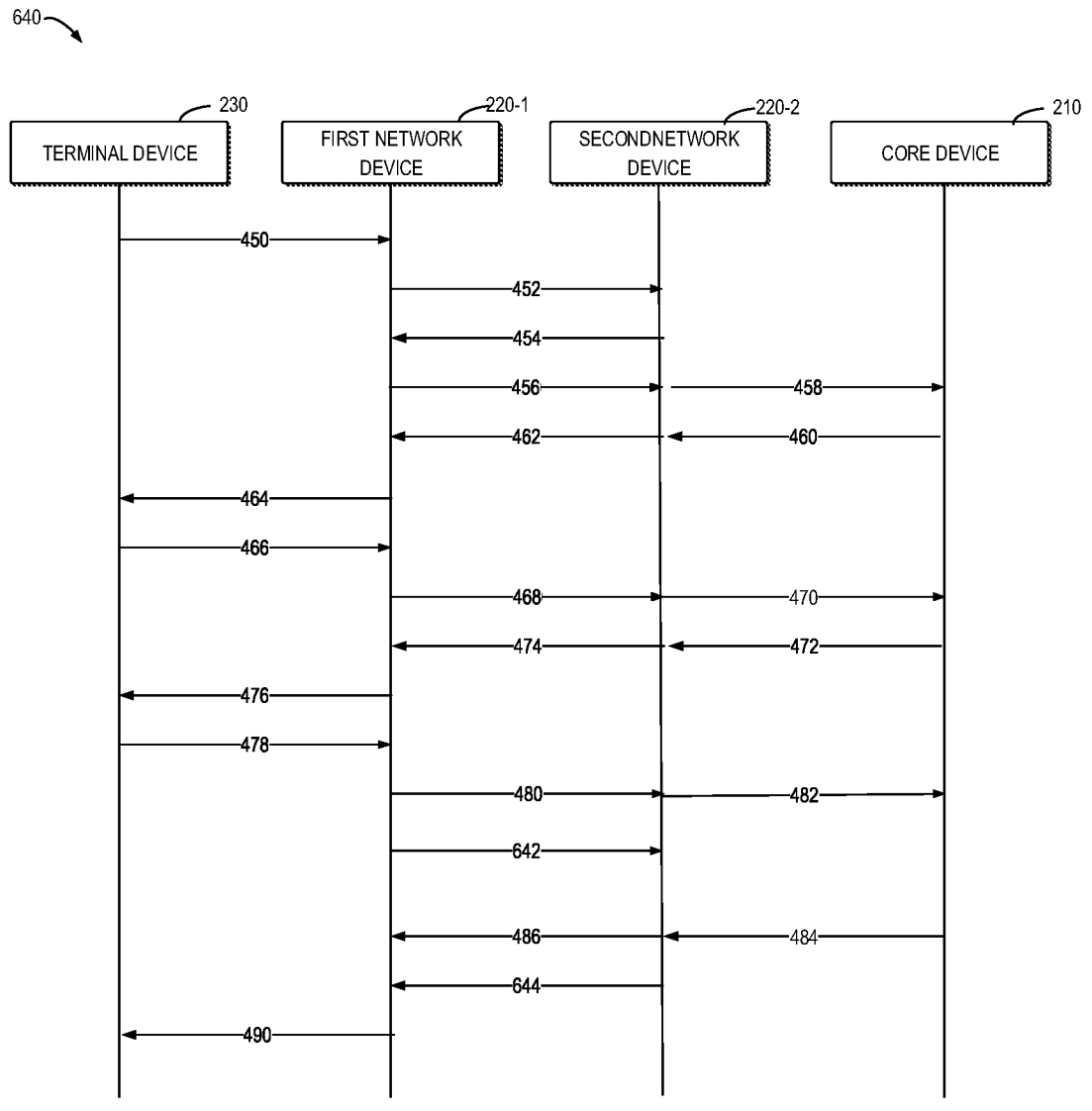
Figure 6C:
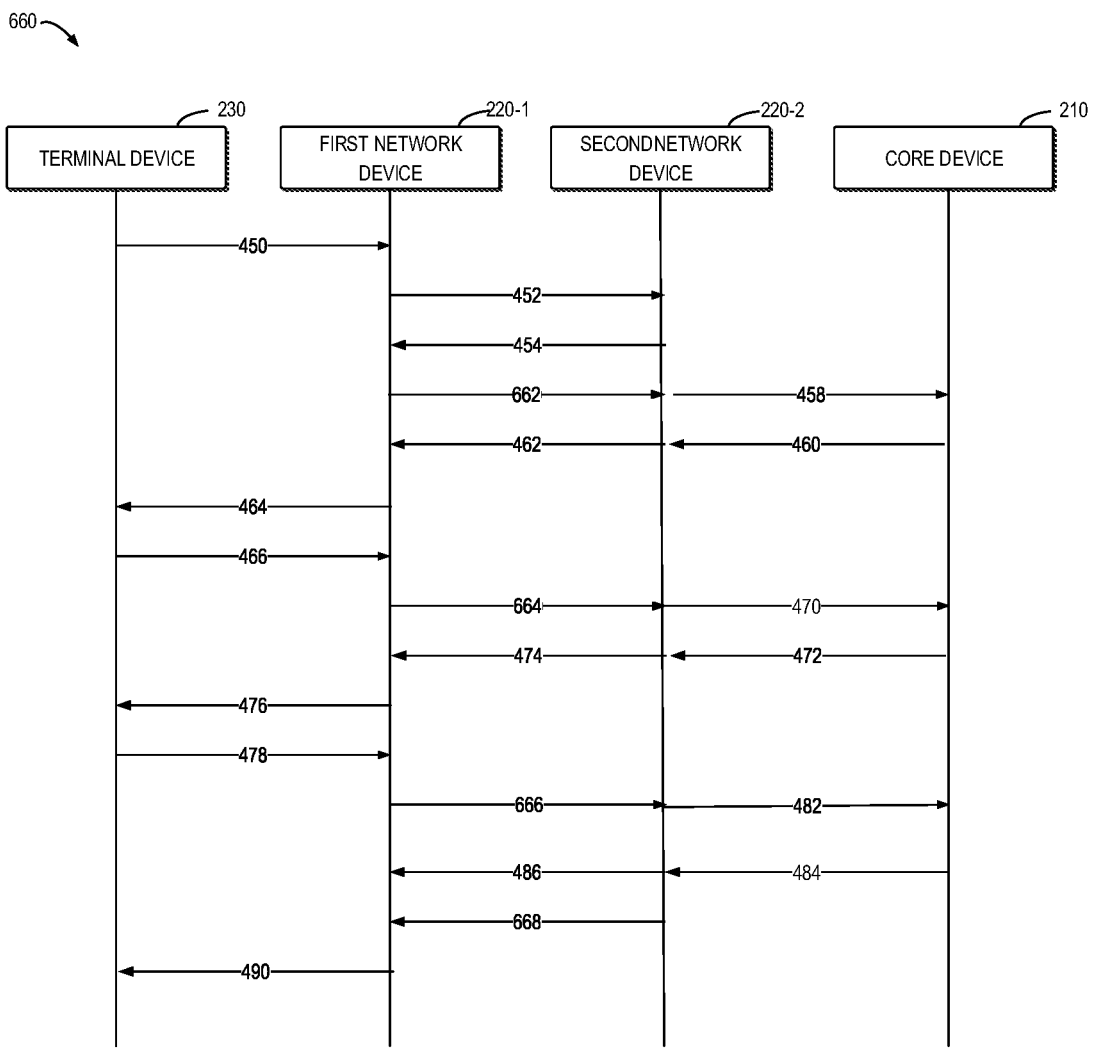

FIGS. 6B and 6C show signaling flows 640 and 660 for UL transmission comprising a subsequent UL data according to some embodiments of the present disclosure, respectively. For the purpose of discussion, the signaling flows 640 and 660 will be described with reference to FIG. 2. The signaling flows 640 and 660 may involve a core device 210 (such as, UPF), a first network device 220-1, a second network device 220-2 and a terminal device 230.

The signaling flows 640 and 660 shown in FIGS. 6B and 6B are similar with the signalling flow 450 shown in FIG. 4B, and the same operations/elements are labelled with same reference number. For the sake of brevity, the descriptions of the same operations/elements are omitted below.

Reference is now made to FIG. 6B first, in the example of FIG. 6B. In the specific example of FIG. 6B, the first network device 220-1 transmits 642 a fourth indication to the second network device 220-2, where the fourth indication indicates that there is no more data related to the terminal device 230 to be transmitted. The fourth indication may be transmitted via a signalling transmitted over an Xn or X2 interface. Alternatively, the fourth indication may be transmitted via at least one end marker packet. Alternatively, the fourth indication may be transmitted via a header of data transmitted from first network device 220-1 to the second network device 220-2. For example, a "RAN Container" GTP-U extension header of GTP-U protocol may be used as the fourth indication, such that the buffer size information (such as, BSR) can be indicated.

If the second network device 220-2 determines a second condition is met, the second network device 220-2 may transmit 644 an Xn message (which carries the third indication) to the first network device 220-1 to terminate the connection between the first network device 220-1 and the second network device 220-2. Further, in the specific example of FIG. 6B, the Xn message may carry information for releasing RRC connection of the terminal device. Alternatively, the third indication is transmitted via at least one end marker packet.

Different from the specific example of FIG. 6B, in the specific example of FIG. 6C, the first network device 220-1 transmits 662 and 664 UL data to the second network device 220-2, which carries the buffer size information. More specifically, the first network device 220-1 may transmit the UL data by using GTP-U protocol, and indicates the buffer size information by using the GTP-U extension header "RAN Container". Further, the first network device 220-1 transmits 666 subsequent UL data to the second network device 220-2, which carries the buffer size information indicates that the buffer size is zero. The buffer size information comprised in the subsequent UL data may be considered as the fourth indication.

Then, the second network device 220-2 determines a second condition is met, and may transmit 668 an Xn message (which carries the third indication) to the first network device 220-1 to terminate the connection between the first network device 220-1 and the second network device 220-2. Further, in the specific example of FIG. 6C, the Xn message may optionally carry information for releasing RRC connection of the terminal device. Alternatively, the third indication is transmitted via at least one end marker packet.

According to the above description, the processes that the second network 220-2 device initiates to terminate the connection between the first network device 220-1 and the second network device 220-2 has been fully discussed.

Example Processes that the Second Network
Device Initiates a Content Relocation Procedure
Foe the Terminal Device During a Up Transmission Reference is now made to FIG. 7, which shows a signaling flow 700 for UL transmission of a terminal device in the inactive mode according to some embodiments of the present disclosure. For the purpose of discussion, the signaling flow 700 will be described with reference to FIG. 2. The signaling flow 700 may involve a first network device 220-1 and a second network device 220-2.

In the example of FIG. 7, the first network device 220-1 transmits 710 the UL data via a connection established for the terminal device 230 between the first network device 220-1 and the second network device 220-2. Further, the first network device 220-2 may transmit 730 a further UL data to the second network device 220-2.

If the second network device 220-2 determines that a third condition is met, the second network device 220-2 transmits 740 a message for initiating the context relocation procedure for the first network device 220-1. Then the first network device 220-1 may perform a context relocation procedure for the terminal device. For example, the first network device 220-1 transmits a path switch request to a core device (such as, AMF). In this way, the second network device 220-2 may determine whether to initiate a context relocation procedure dynamically and timely. The third condition is used by the second network device 220-2 to determine whether to initiate a content relocation for the terminal device 230 or not.

In some example embodiments, the message may be transmitted via a signalling transmitted over an Xn or X2 interface. In some example, RETRIEVE UE CONTEXT RESPONSE can be used. In other example embodiments, any suitable message or signalling may be used for transmitting the above message. In this way, message for initiating the context relocation procedure may be transmitted to the second network device 220-2 flexibly.

Additionally, in some example embodiments, the first network device transmits 720 a fifth indication to the second network device 220-2, where the fifth indication indicates an amount of data related to the terminal devise 230 to be transmitted. In this way, the second network device 220-2 may obtain the state of the UL transmission in time, and if the second network device 220-2 determine that the subsequent UL transmission becomes a burden for the second network device 220-2, the second network device 220-2 may initiate a context relocation procedure timely. For example, during subsequent transmission, if the BSR of the terminal device 230 increases significantly, the first network device 220-2 can send Xn message to the second network device 220-2 to request for a context again, where the Xn message can include the updated buffer size information. As a result, the second network device 220-2 may determine to initiate a content relocation procedure.

In some example embodiments, the fifth indication may be transmitted via a signalling transmitted over an Xn or X2 interface. Alternatively, the fifth indication may be transmitted via a header of data transmitted from first network device to the second network device. For example, the "RAN Container" GTP-U extension header of GTP-U protocol may be used as the fifth indication, such that the buffer size information (such as, BSR) can be indicated.

It is to be understood that the above illustrated signaling or packet for transmitting the fifth indication are only for the purpose of illustration without suggesting any limitations. In other example embodiments, any suitable message or signalling may be used for transmitting the fifth indication. In this way, the fifth indication may be transmitted to the second network device 220-2 flexibly.

Alternatively, or in addition, in some example embodiments, if the second network 220-2 determines that the DL transmission received from the core device 210 becomes a burden for the second network 220-2, the second network 220-2 may determines that the content relocation condition is met and transmit the message for initiating the content relocation thereby.

Alternatively, or in addition, in some example embodiments, if the second network 220-2 determine that the resources (such as, frequency resources, time resources, code resource, space resource, hardware resource, and so on) are not sufficient for the subsequent transmission (such as, subsequent UL data or subsequent DL data), the second network 220-2 may determines that the content relocation condition is met and transmit the message for initiating the content relocation thereby.

It is to be understood the second network device 220-2 may determine whether the content relocation termination condition is met or not according to any suitable criterion or their combination. In this way, the second network device 220-2 may initiate the content relocation procedure more suitable.

Additionally, the connection between the first network device 220-1 and the second network device 220-2 should be terminated. Further, the connection termination procedure can be initiated by either the first network device 220-1 or the second network device 220-2 by any suitable manner as discussed above. Further, the connection termination procedure can be performed at any suitable occasions, such as, before or after transmitting the message for initiating the content relocation procedure, and before or after transmitting the path switch request.

In this way, the second network device 220-2 may determine whether to initiate a context relocation procedure dynamically and timely if the subsequent transmission (including subsequent UL data and DL data) becomes a burden for the second network device 220-2.

To better describe the above process, some specific examples are provided as below only for the purpose of illustration without suggesting any limitations.

FIGS. 8A and 8B show signaling flows 800 and 850 for UL transmission according to some embodiments of the present disclosure, respectively. For the purpose of discussion, the signaling flows 800 and 850 will be described with reference to FIG. 2. The signaling flows 800 and 850 may involve a core device 210 (such as, UPF and AMF), a first network device 220-1, a second network device 220-2 and a terminal device 230.

The signaling flows 800 and 850 shown in FIGS. 8A and 8B are similar with the signalling flow 450 shown in FIG. 4B, and the same operations/elements are labelled with same reference number. For the sake of brevity, the descriptions of the same operations/elements are omitted below.

Reference is now made to FIG. 8A first, in the example of FIG. 8A, the second network device 220-2 receives 810 a fifth indication indicates an amount of data related to the terminal devise 230 to be transmitted from the first network device. In the specific example of FIG. 8A, the fifth indication is transmitted via a signaling over Xn interface.

The second network device 220-2 determines that a third condition is met, and the second network device 220-2 transmits 820 a message for initiating the context relocation procedure to the first network device 220-1. In the specific example of FIG. 8A, the message is transmitted via a signaling over Xn interface. Then, the first network device 220-1 transmits 830 a path switch request to a core device (such as, AMF). Alternatively, it is should be understood that if the second network device 220-2 also may determines not to initiated a context relocation procedure (i.e., the second network device 220-2 determines to continue subsequent transmission without UE context relocation). Additionally, the second network device 202-2 may transmit a message to first network device to keep the UE context location. In some example embodiments, the existing RETRIVE UE CONTEX FAILURE message can be used. As a result, the first network device will still forward the subsequent UP data to the second network device 220-2 In other words, the second device 220-2 may determine whether to initiate the content relocation procedure dynamically, and the related determination result may be transmitted to the first network device 220-1.

Although not shown in the FIG. 8A, it is to be understood that the connection between the first network device 220-1 and the second network device 220-2 should be terminated.

Different from the specific example of FIG. 8A, in the specific example of FIG. 8B, the first network device 220-1 transmits 852, 854 and 856 UL data to the second network device 220-2, which carries the buffer size information. More specifically, the first network device 220-1 may transmit the UL data by using GTP-U protocol, and indicates the buffer size information by using the GTP-U extension header "RAN Container". Therefore, the second network device may obtain the state of the UP transmission timely.

The second network device 220-2 determines that the third condition is met, and the second network device 220-2 transmits 858 a message for initiating the context relocation procedure to the first network device 220-1. In the specific example of FIG. 8B, the message is transmitted via a signalling over Xn interface. Then, the first network device 220-1 the first network device transmits 860 a path switch request to a core device (such as, AMF).

Although not shown in the FIG. 8B, it is to be understood that the connection between the first network device 220-1 and the second network device 220-2 should be terminated.

According to the above description, the process that the second network device 220-2 initiates a content relocation procedure during a UP transmission has been fully discussed.

FIG. 9 shows a flowchart of an example method 900 implemented at a first network device 220-1 in accordance with some example embodiments of the present disclosure. For the purpose of discussion, the method 900 will be described from the perspective of the first network device 220-1 with respect to FIG. 2.

At block 910, first network device 220-1 transmits data received from a terminal device 230 in an inactive mode via a connection established for the terminal device 230 between the first network device 220-1 and the second network device 220-2 to a second network device 220-2.

At block 920, first network device 220-1 transmits to the second network device 220-2 a first indication indicating a termination of a data transmission related with the terminal device 230 in accordance with a determination that a first condition is met.

In some example embodiments, first network device 220-1 receives the data being absent of information about an amount of data to be transmitted at the terminal device 230 from the terminal device 230, and determines the first condition is met.

In some example embodiments, first network device 220-1 receives the data comprising a second indication that indicates there is no more data to be transmitted at the terminal device 230, and determines the first condition is met.

In some example embodiments, first network device 220-1 transmits the first indication via one of the following: a signaling transmitted over an Xn interface, a signaling transmitted over an X2 interface, or at least one end marker packet.

FIG. 10 shows a flowchart of an example method 1000 implemented at a second network device 220-2 in accordance with some example embodiments of the present disclosure. For the purpose of discussion, the method 1000 will be described from the perspective of the second network device 220-2 with respect to FIG. 2.

At block 1010, the second network device 220-2 receives a data received by the first network device 220-1 and from a terminal device 230 in an inactive mode via a connection established for the terminal device 230 between the first network device 220-1 and the second network device 220-2 from a first network device 220-1.

At block 1010, the second network device 220-2 receives a first indication indicating a termination of a data transmission related with the terminal device 230 from the first network device 220-1, the first indication transmitted by the first network device 220-1 according to the first condition.

In some example embodiments, the second network device 220-2 receives the first indication via one of the following: a signaling transmitted over an Xn interface, a signaling transmitted over an X2 interface, or at least one end marker packet.

FIG. 11 shows a flowchart of an example method 1100 implemented at a first network device 220-1 in accordance with some example embodiments of the present disclosure. For the purpose of discussion, the method 1100 will be described from the perspective of the first network device 220-1 with respect to FIG. 2.

At block 1110, first network device 220-1 transmits data received from a terminal device 230 in an inactive mode via a connection established for the terminal device 230 between the first network device 220-1 and the second network device 220-2 to a second network device 220-2.

At block 1120, first network device 220-1 transmits receives a third indication indicating a termination of a data transmission related with the terminal device 230, from the second network device 220-2, a third indication transmitted by the second network device 220-2 according to a second condition.

In some example embodiments, the first network device 220-1 receives the third indication via one of the following: a signaling transmitted over an Xn interface, a signaling transmitted over an X2 interface, or at least one end marker packet.

In some example embodiments, the first network device 220-1 receives information for releasing radio resource control (RRC) connection of the terminal device 230 generated by the second network device 220-2 from the second network device 220-2 and together with the third indication, and transmits a RRC release message generated by the first network device 220-1 based on the information to the terminal device 230.

In some example embodiments, the first network device 220-1 transmits a fourth indication that indicating that no more data related to the terminal device 230 is to be transmitted to the second network device 220-2 and receives the third indication indicating a termination of a data transmission related with the terminal device 230 from the second network device 220-2.

In some example embodiments, the first network device 220-1 transmits the fourth indication via one of the following: a signaling transmitted over an Xn interface, a signaling transmitted over an X2 interface, at least one end marker packet, or a header of data transmitted from first network device 220-1 to the second network device 220-2.

FIG. 12 shows a flowchart of an example method 1200 implemented at a second network device 220-2 in accordance with some example embodiments of the present disclosure. For the purpose of discussion, the method 1200 will be described from the perspective of the second network device 220-2 with respect to FIG. 2.

At block 1210, the second network device 220-2 receives a data received by the first network device 220-1 and from a terminal device 230 in an inactive mode via a connection established for the terminal device 230 between the first network device 220-1 and the second network device 220-2 from a first network device 220-1.

At block 1220, the second network device 220-2 transmits a third indication indicating a termination of a data transmission related with the terminal device 230 to the first network device 220-1 in accordance with a determination that a second condition is met.

In some example embodiments, the second network device 220-2 determines that a second condition is met in response to receiving, from the first network device 220-1, a fourth indication that indicating that no more data related to the terminal device 230 is to be transmitted.

In some example embodiments, the fourth indication is received via one of the following: a signaling transmitted over an Xn interface, a signaling transmitted over an X2 interface, at least one end marker packet, or a header of data transmitted from first network device 220-1 to the second network device 220-2.

In some example embodiments, the second network device 220-2 transmits the third indication via one of the following: a signaling transmitted over an Xn interface, a signaling transmitted over an X2 interface, or at least one end marker packet.

In some example embodiments, the second network device 220-2 transmits information for releasing radio resource control (RRC) connection of the terminal device 230 together with the third indication.

FIG. 13 shows a flowchart of an example method 1300 implemented at a first network device 220-1 in accordance with some example embodiments of the present disclosure. For the purpose of discussion, the method 1300 will be described from the perspective of the first network device 220-1 with respect to FIG. 2.

At block 1310, the first network device 220-1 transmits data received from a terminal device 230 in an inactive mode via a connection established for the terminal device 230 between the first network device 220-1 and the second network device 220-2 to a second network device 220-2.

At block 1320, the first network device 220-1 receives a message for initiating the context relocation procedure from the second network device 220-2, a message transmitted by the second network device 220-2 according to a third condition.

In some example, the first network device 220-1 transmits a fifth indication indicating an amount of data related to the terminal device 230 to be transmitted to the second network device 220-2 and receives the message for initiating the context relocation procedure from the second network device 220-2.

In some example, the first network device 220-1 transmits the fifth indication via one of the following: a header of data transmitted from the first network device 220-1 to the second network device 220-2, a signaling transmitted over an Xn interface, or a signaling transmitted over an X2 interface.

FIG. 14 shows a flowchart of an example method 1400 implemented at a second network device 220-2 in accordance with some example embodiments of the present disclosure. For the purpose of discussion, the method 1400 will be described from the perspective of the second network device 220-2 with respect to FIG. 2.

At block 1410, the second network device 220-2 receives a data received by the first network device 220-1 and from a terminal device 230 in an inactive mode via a connection established for the terminal device 230 between the first network device 220-1 and the second network device 220-2 from a first network device 220-1.

At block 1420, the second network device 220-2 transmits a message for initiating the context relocation procedure to the first network device in accordance with a determination that a third condition is met.

In some example, the second network device 220-2 receives a fifth indication indicating an amount of data related to the terminal device 230 to be transmitted from the first network device 220-1 and transmits the message for initiating the context relocation procedure to the first network device 220-1.

In some example, the second network device 220-2 receives the fifth indication via one of the following: a header of data transmitted from the first network device 220-1 to the second network device 220-2, a signaling transmitted over an Xn interface, or a signaling transmitted over an X2 interface.

In some embodiments, a first network device comprises circuitry configured to: transmit, at a first network device and to a second network device, data received from a terminal device in an inactive mode via a connection established for the terminal device between the first network device and the second network device; and in accordance with a determination that a first condition is met, transmit, to the second network device, a first indication indicating a termination of a data transmission related with the terminal device 230.

In some embodiments, a first network device comprises circuitry configured to: determine the first condition is met, in response to at least one of the following: receiving, from the terminal device, the data being absent of information about an amount of data to be transmitted at the terminal device; or receiving, from the terminal device the data comprising a second indication that indicates there is no more data to be transmitted at the terminal device.

In some embodiments, a first network device comprises circuitry configured to: transmit the first indication via one of the following: a signaling transmitted over an Xn interface, a signaling transmitted over an X2 interface, or at least one end marker packet.

In some embodiments, a second network device comprises circuitry configured to: receive, at a second network device and from a first network device, a data received by the first network device and from a terminal device in an inactive mode via a connection established for the terminal device between the first network device and the second network device; and receive, from the first network device, a first indication indicating a termination of a data transmission related with the terminal device 230, the first indication transmitted by the first network device according to a first condition.

In some embodiments, a second network device comprises circuitry configured to: receive the first indication via one of the following: a signaling transmitted over an Xn interface, a signaling transmitted over an X2 interface, or at least one end marker packet.

In some embodiments, a first network device comprises circuitry configured to: transmit, at a first network device and to a second network device, data received from a terminal device in an inactive mode via a connection established for the terminal device between the first network device and the second network device; and receive, from the second network device, a third indication indicating a termination of a data transmission related with the terminal device 230, a third indication transmitted by the second network device according to a second condition.

In some embodiments, a first network device comprises circuitry configured to: receive the third indication via one of the following: a signaling transmitted over an Xn interface, a signaling transmitted over an X2 interface, or at least one end marker packet.

In some embodiments, a first network device comprises circuitry configured to: receive, from the second network device and together with the third indication, information for releasing radio resource control (RRC) connection of the terminal device generated by the second network device; and transmit, to the terminal device, a RRC release message generated by the first network device based on the information.

In some embodiments, a first network device comprises circuitry configured to: transmit, to the second network device, a fourth indication that indicating that no more data related to the terminal device is to be transmitted; and receive, from the second network device the third indication indicating a termination of a data transmission related with the terminal device 230.

In some embodiments, a first network device comprises circuitry configured to: transmit the fourth indication via one of the following: a signaling transmitted over an Xn interface, a signaling transmitted over an X2 interface, at least one end marker packet, or a header of data transmitted from first network device to the second network device.

In some embodiments, a second network device comprises circuitry configured to: receive, at a second network device and from a first network device, a data received by the first network device and from a terminal device in an inactive mode via a connection established for the terminal device between the first network device and the second network device; and in accordance with a determination that a second condition is met, transmit, to the first network device, a third indication indicating a termination of a data transmission related with the terminal device 230.

In some embodiments, a second network device comprises circuitry configured to: determine that a second condition is met in response to receiving, from the first network device, a fourth indication that indicating that no more data related to the terminal device is to be transmitted.

In some embodiments, a second network device comprises circuitry configured to: receive the fourth indication via one of the following: a signaling transmitted over an Xn interface, a signaling transmitted over an X2 interface, at least one end marker packet, or a header of data transmitted from first network device to the second network device.

In some embodiments, a second network device comprises circuitry configured to: transmit the third indication via one of the following: a signaling transmitted over an Xn interface, a signaling transmitted over an X2 interface, or at least one end marker packet.

In some embodiments, a second network device comprises circuitry configured to: transmit information for releasing radio resource control (RRC) connection of the terminal device together with the third indication.

In some embodiments, a first network device comprises circuitry configured to: transmit, at a first network device and to a second network device, data received from a terminal device in an inactive mode via a connection established for the terminal device between the first network device and the second network device; and receive, from the second network device, a message for initiating the context relocation procedure, a message transmitted by the second network device according to a third condition.

In some embodiments, a first network device comprises circuitry configured to: transmit, to the second network device, a fifth indication indicating an amount of data related to the terminal device to be transmitted; and receive, from the second network device, the message for initiating the context relocation procedure.

In some embodiments, a first network device comprises circuitry configured to: transmit the fifth indication via one of the following: a header of data transmitted from the first network device to the second network device, a signaling transmitted over an Xn interface, or a signaling transmitted over an X2 interface.

In some embodiments, a second network device comprises circuitry configured to: receive, at a second network device and from a first network device, a data received by the first network device and from a terminal device in an inactive mode via a connection established for the terminal device between the first network device and the second network device; and in accordance with a determination that a third condition is met, transmit, to the first network device, a message for initiating the context relocation procedure.

In some embodiments, a second network device comprises circuitry configured to: receive, from the first network device, a fifth indication indicating an amount of data related to the terminal device to be transmitted; and transmit, to the first network device, the message for initiating the context relocation procedure.

In some embodiments, a second network device comprises circuitry configured to: receive the fifth indication via one of the following: a header of data transmitted from the first network device to the second network device, a signaling transmitted over an Xn interface, or a signaling transmitted over an X2 interface.

Figure 15:
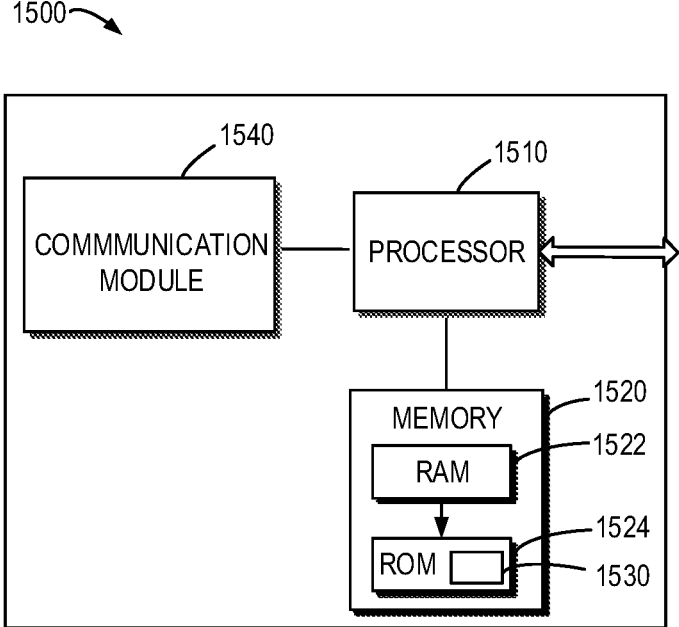
FIG. 15 illustrates a simplified block diagram of an apparatus that is suitable for implementing example embodiments of the present disclosure.

FIG. 15 is a simplified block diagram of a device 1500 that is suitable for implementing example embodiments of the present disclosure. The device 1500 may be provided to implement a communication device, for example, the first network device 220-1 and the second network device 220-2 as shown in FIG. 2. As shown, the device 1500 includes one or more processors 1510, one or more memories 1520 coupled to the processor 1510, and one or more communication modules 1540 coupled to the processor 1510.

The communication module 1540 is for bidirectional communications. The communication module 1540 has one or more communication interfaces to facilitate communication with one or more other modules or devices. The communication interfaces may represent any interface that is necessary for communication with other network elements. In some example embodiments, the communication module 1540 may include at least one antenna.

The processor 1510 may be of any type suitable to the local technical network and may include one or more of the following: general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The memory 1520 may include one or more non-volatile memories and one or more volatile memories. Examples of the non-volatile memories include, but are not limited to, a Read Only Memory (ROM) 1524, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 1522 and other volatile memories that will not last in the power-down duration.

A computer program 1530 includes computer executable instructions that are executed by the associated processor 1510. The program 1530 may be stored in the memory, e.g., ROM 1524. The processor 1510 may perform any suitable actions and processing by loading the program 1530 into the RAM 1522.

The example embodiments of the present disclosure may be implemented by means of the program 1530 so that the device 1500 may perform any process of the disclosure as discussed with reference to FIGS. 1-14. The example embodiments of the present disclosure may also be implemented by hardware or by a combination of software and hardware.

In some example embodiments, the program 1530 may be tangibly contained in a computer readable medium which may be included in the device 1500 (such as in the memory 1520) or other storage devices that are accessible by the device 1500. The device 1500 may load the program 1530 from the computer readable medium to the RAM 1522 for execution. The computer readable medium may include any types of tangible non-volatile storage, such as ROM, EPROM, a flash memory, a hard disk, CD, DVD, and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a first network device, the method comprising:

transmitting a retrieve user equipment (UE) context request message to a second network device;

receiving a partial context for a terminal device from the second network device;

transmitting a first message comprising a reason for termination of a small data transmission (SDT) procedure to the second network device;

receiving a second message comprising a radio resource control (RRC) release message from the second network device, wherein the second message is a RETRIEVE UE CONTEXT FAILURE message; and transmitting the RRC release message to the terminal device.

2. The method of claim 1, wherein the reason for termination of the SDT procedure comprises no more packets to be transmitted or large uplink SDT data from a buffer state report (BSR).

3. The method of claim 1, wherein, after the SDT procedure is terminated by the second network device, downlink data transferring between the first network device and the second network device is stopped.

4. The method of claim 1, wherein the transmitting the first message and the receiving the second message are over an Xn interface.

5. A method performed by a terminal device, the method comprising:

transmitting a radio resource control (RRC) resume request message and uplink small data transmission (SDT) data to a first network device; and receiving a RRC release message from the first network device, wherein a retrieve user equipment (UE) context request message is transmitted from the first network device to a second network device, a partial context for the terminal device is transmitted from the second network device to the first network device, a first message comprising a reason for termination of a SDT procedure is transmitted from the first network device to a second network device, and a second message comprising the RRC release message is transmitted from the second network device to the first network device, and wherein the second message is a RETRIEVE UE CONTEXT FAILURE message.

6. The method of claim 5, wherein the reason for termination of the SDT procedure comprises no more packets to be transmitted or large uplink SDT data from a buffer state report (BSR).

7. The method of claim 5, wherein, after the SDT procedure is terminated by the second network device, downlink data transferring between the first network device and the second network device is stopped.

8. The method of claim 5, wherein the transmitting the first message and the receiving the second message are over an Xn interface.

9. A first network device comprising a processor configured to cause the first network device to:

transmit a retrieve user equipment (UE) context request message to a second network device;

receive a partial context for a terminal device from the second network device;

transmit a first message comprising a reason for termination of a small data transmission (SDT) procedure to the second network device;

receive a second message comprising a radio resource control (RRC) release message from the second network device, wherein the second message is a RETRIEVE UE CONTEXT FAILURE message; and transmit the RRC release message to the terminal device.

10. The first network device of claim 9, wherein the reason for termination of the SDT procedure comprises no more packets to be transmitted or large uplink SDT data from a buffer state report (BSR).

11. The first network device of claim 9, wherein, after the SDT procedure is terminated by the second network device, downlink data transferring between the first network device and the second network device is stopped.

12. The first network device of claim 9, wherein the transmitting the first message and the receiving the second message are over an Xn interface.

\*  \*  \*  \*  \*